(12) United States Patent
Tajima et al.

(10) Patent No.: US 9,940,964 B2
(45) Date of Patent: Apr. 10, 2018

(54) OPTICAL INFORMATION RECORDING/REPRODUCING DEVICE, OPTICAL INFORMATION REPRODUCING DEVICE, AND OPTICAL INFORMATION REPRODUCING METHOD

(71) Applicant: HITACHI CONSUMER ELECTRONICS CO., LTD., Yokohama-shi, Kanagawa (JP)

(72) Inventors: Kazuyuki Tajima, Tokyo (JP); Yusuke Nakamura, Tokyo (JP)

(73) Assignee: Hitachi Consumer Electronics Co., Ltd., Kanagawa (JP)

( * ) Notice: Subject to any disclaimer, the term of this patent is extended or adjusted under 35 U.S.C. 154(b) by 0 days.

(21) Appl. No.: 15/544,028

(22) PCT Filed: Feb. 23, 2015

(86) PCT No.: PCT/JP2015/054908
§ 371 (c)(1),
(2) Date: Jul. 17, 2017

(87) PCT Pub. No.: WO2016/135801
PCT Pub. Date: Sep. 1, 2016

(65) Prior Publication Data
US 2018/0012624 A1 Jan. 11, 2018

(51) Int. Cl.
*G11B 7/00* (2006.01)
*G11B 7/0065* (2006.01)
*G03H 1/04* (2006.01)

(52) U.S. Cl.
CPC ......... *G11B 7/0065* (2013.01); *G03H 1/0402* (2013.01); *G03H 2001/0417* (2013.01);
(Continued)

(58) Field of Classification Search
CPC ... G11B 7/0065; G11B 7/083; G11B 7/00781; G11B 20/10009; G11B 7/005; G11B 20/10055; G11B 7/0053
(Continued)

(56) References Cited

U.S. PATENT DOCUMENTS 9,363,491 B2 * 6/2016 Kawai .................. H04N 9/045
2004/0179251 A1   9/2004 Anderson et al.
(Continued)

FOREIGN PATENT DOCUMENTS

JP   2004-272268 A   9/2004
JP   2006-267539 A   10/2006
(Continued)

OTHER PUBLICATIONS

International Search Report of PCT/JP2015/054908 dated Apr. 7, 2015.

*Primary Examiner* — Nabil Hindi
(74) *Attorney, Agent, or Firm* — Mattingly & Malur, PC

(57) ABSTRACT

An optical information recording/reproducing device which records an interference pattern between a reference beam and a signal beam as a hologram in an optical information storage medium or reproduces information from the optical information storage medium, the optical information recording/reproducing device includes a light source unit which emits a light beam, a signal-beam/reference-beam optical unit which generates the signal beam and the reference beam from the light beam and irradiates the optical information storage medium, a spatial light modulator which adds information to the generated signal beam, a photodetection unit which detects a reproduced beam from the optical information storage medium and acquires a reproduced image constituted by a plurality of pixels arrayed in a lattice shape, and a signal processing unit which performs equalization (Continued)

processing to a first pixel of the reproduced image to have a target characteristic.

19 Claims, 17 Drawing Sheets

(52) U.S. Cl.
CPC ............... *G03H 2001/0441* (2013.01); *G11B 2007/00653* (2013.01)

(58) Field of Classification Search
USPC ................. 369/103, 59.21, 59.22, 124.12
See application file for complete search history.

(56) References Cited

U.S. PATENT DOCUMENTS

| 2007/0171796 A1 | 7/2007 | Tokuyama |
| 2009/0316559 A1 | 12/2009 | Nakamura |
| 2012/0163152 A1 | 6/2012 | Hosaka et al. |

FOREIGN PATENT DOCUMENTS

| JP | 2007-200385 A | 8/2007 |
| JP | 2008-117440 A | 5/2008 |
| JP | 2010-003358 A | 1/2010 |
| JP | 2012-138146 A | 7/2012 |
| JP | 2014-053069 A | 3/2014 |
| WO | 2013/114455 A1 | 8/2013 |

\* cited by examiner

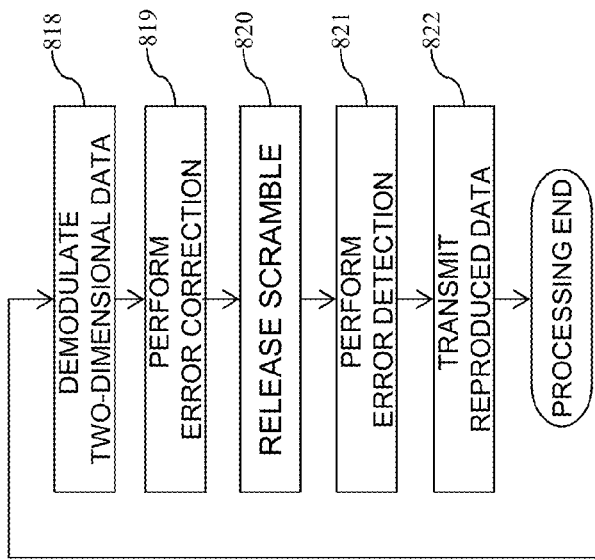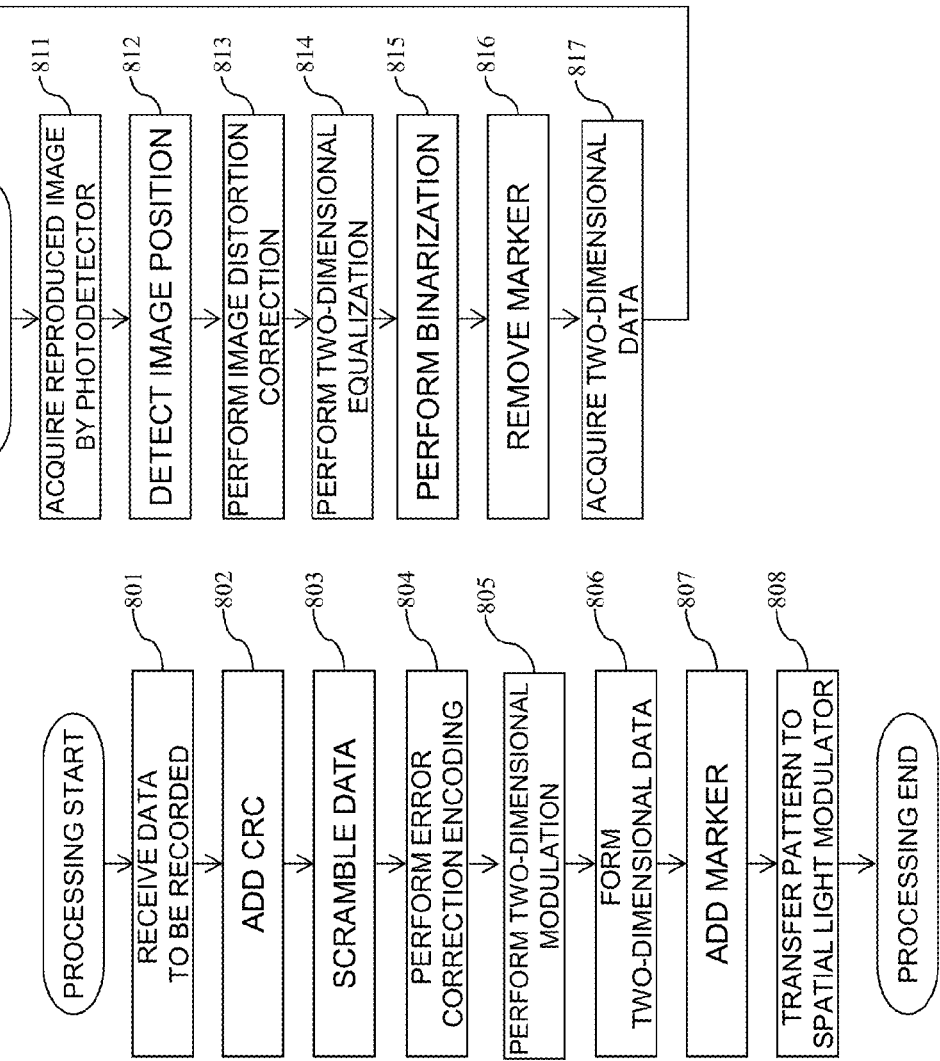

FIG. 11a
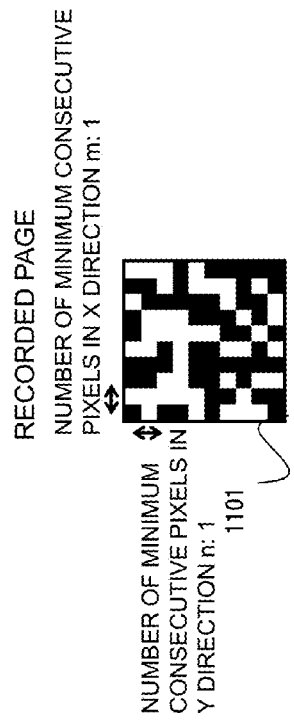
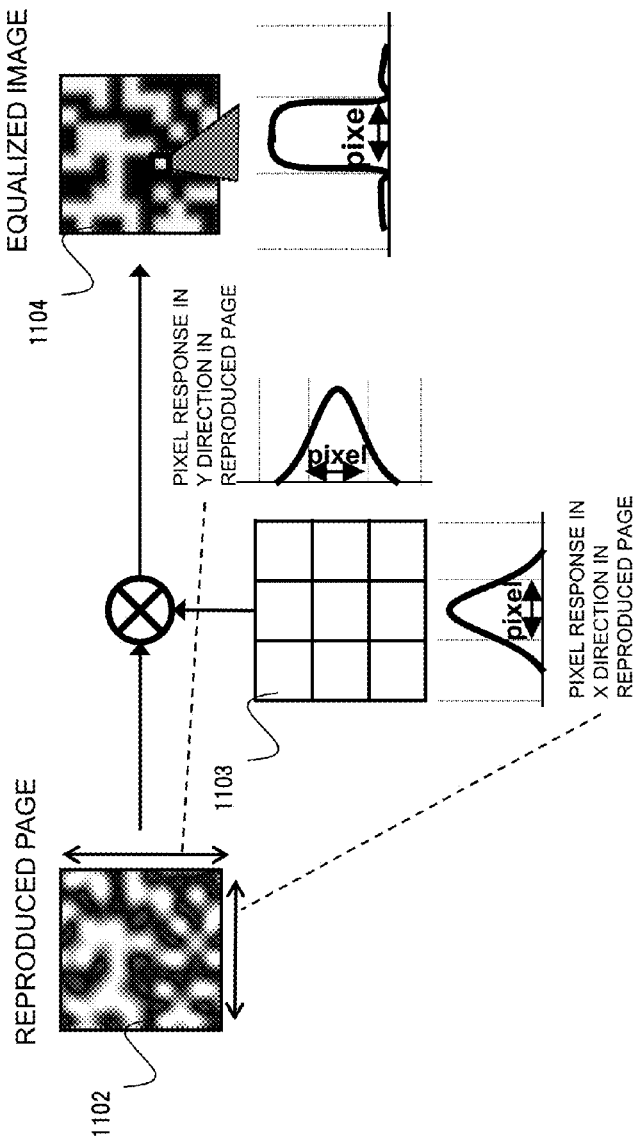

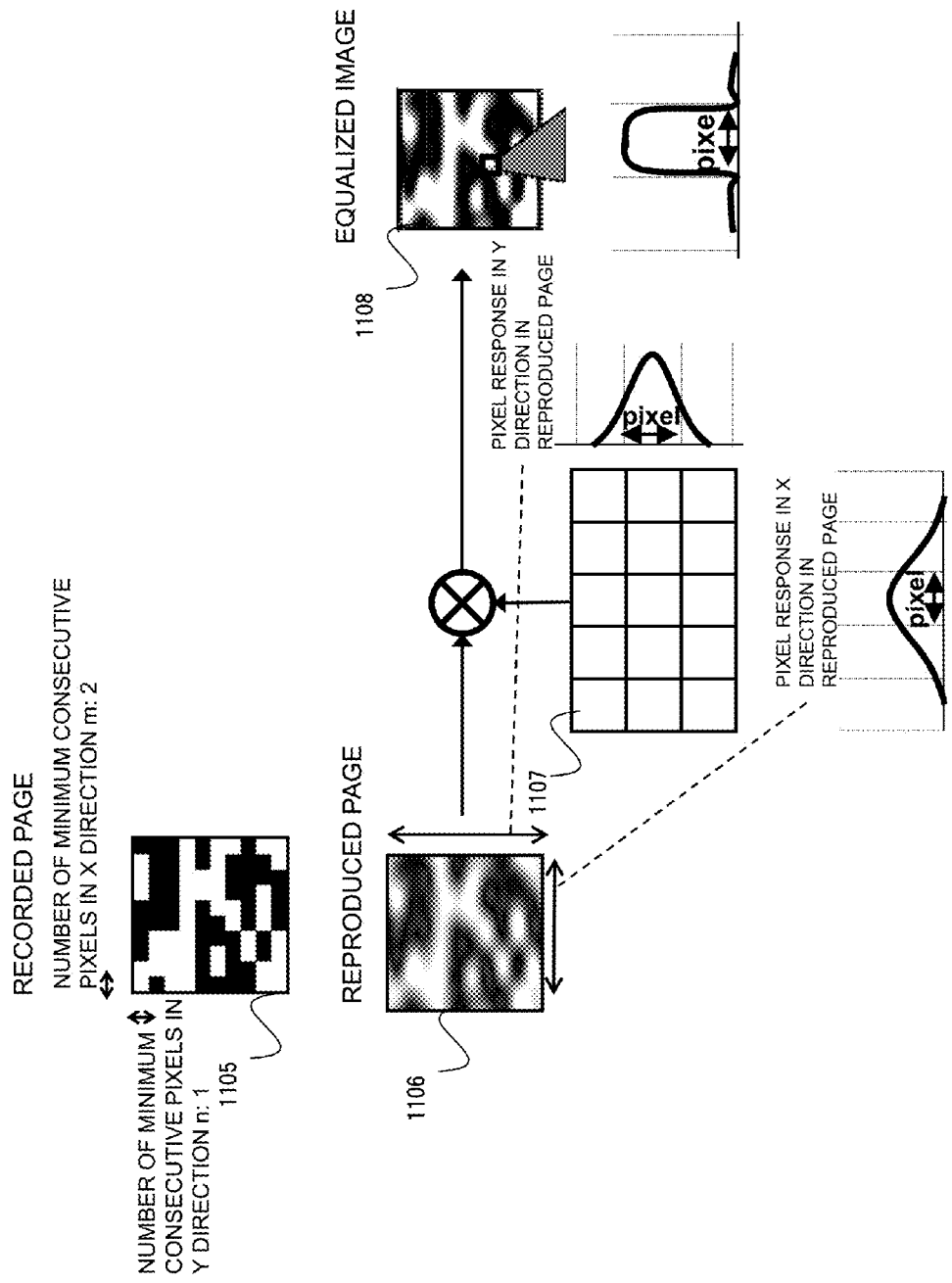

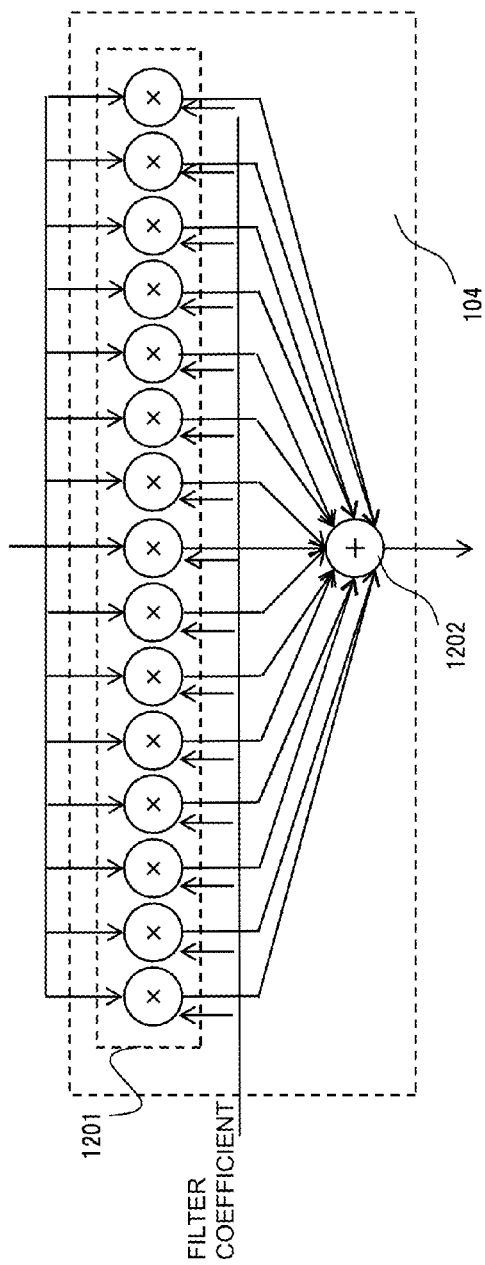

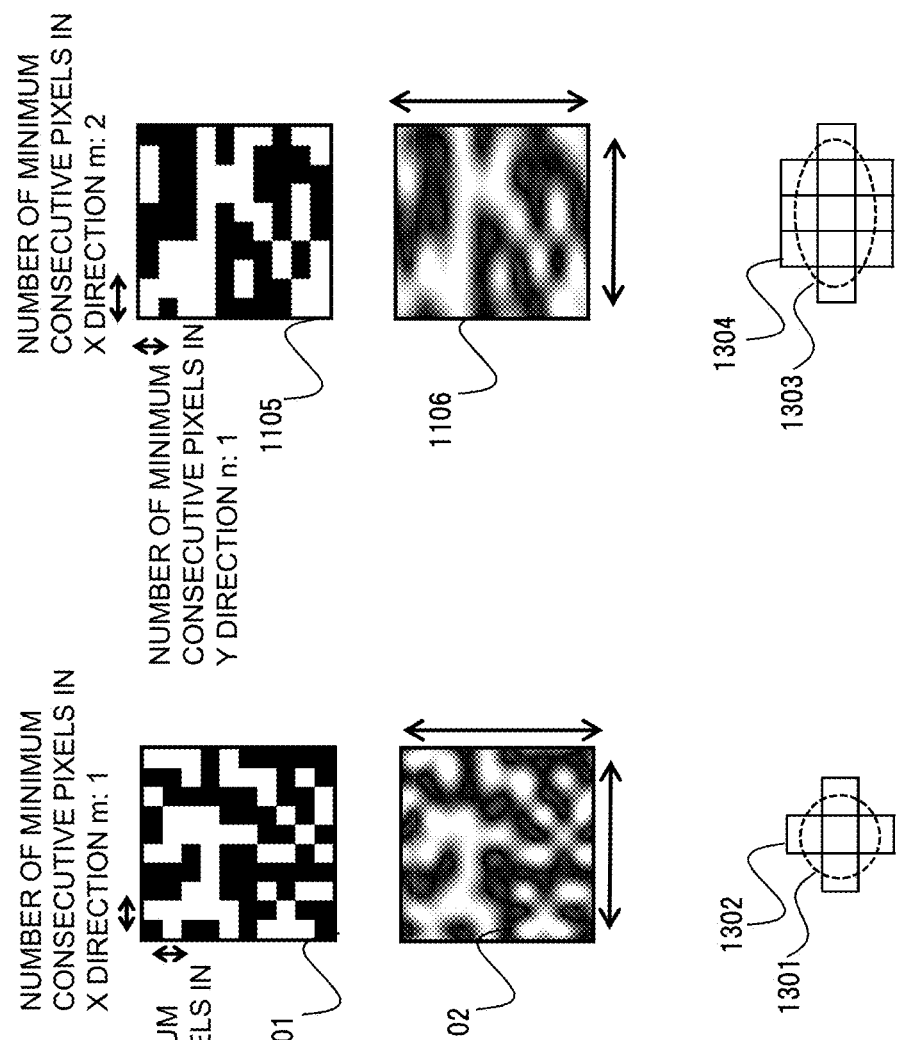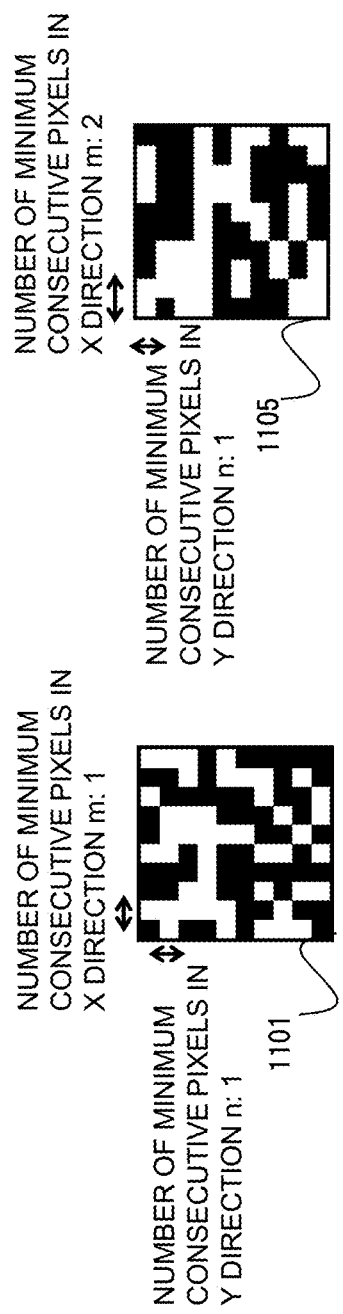
FIG. 13a
FIG. 13b

REMOVING REGION WHEN FILTER COEFFICIENT IS CALCULATED

DEFECTIVE PIXEL

OPTICAL INFORMATION RECORDING/REPRODUCING DEVICE, OPTICAL INFORMATION REPRODUCING DEVICE, AND OPTICAL INFORMATION REPRODUCING METHOD

TECHNICAL FIELD

The present invention relates to a technique for recording information in an optical information storage medium or reproducing information using holography.

BACKGROUND ART

As a high-density recording technique for holograms, for example, there is JP 2004-272268 A (Patent Literature 1). Abstract of this literature discloses as follows: A multiplexing method and apparatus that allows holograms to be spatially multiplexed with partial spatial overlap between neighboring stacks of holograms. Each individual stack can additionally take full advantage of an alternate multiplexing scheme such as angle, wave length, phase code, peristrophic, or fractal multiplexing. An amount equal to the beam waist of the signal beam writing a hologram separates individual stacks of holograms. Upon reconstruction, a hologram and its neighboring holograms will all be readout simultaneously. A filter is placed at the beam waist of the reconstructed data such that the neighboring holograms that are readout are not transmitted to the camera plane. Alternatively, these unwanted reconstructions ban be filtered out with an angular filter at an intermediate plane in the optical system that has a limited angular pass band.

Furthermore, Abstract of JP 2014-53069 A (Patent Literature 2) discloses as follows: An optical information recording/reproducing apparatus for recording information using holography including a signal generation section which generates two-dimensional data by a two-dimensional encoding method in which a lower limit value of the number of consecutive ON/OFF pixels in an array in one direction of the pixels in a two-dimensional spatial light modulator is K ($K \geq 2$, K: a natural number) and a pickup which records the two-dimensional data generated by the signal generation section on a hologram disc can solve the problem.

As an equalization technique for reproducing holograms, for example, there is JP 2006-267539 A (Patent Literature 3). Abstract of this literature discloses as follows: An eliminator includes a pixel extractor 101 which extracts a target pixel and peripheral pixels of the target pixel from a read digital image, a filter 102 which inputs the target pixel and the peripheral pixels and eliminates noise of the target pixel, and a first coefficient selector 105 which selects a filter coefficient for the filter 102 from a first coefficient memory 104 based on a pattern of binarized data subjected to temporary determination and inputs the filter coefficient to the filter 102, and the noise caused by interference from the peripheral pixels can be eliminated by filtering according to the pattern of the peripheral binarized data by the filter 102.

CITATION LIST

Patent Literature

Patent Literature 1: JP 2004-272268 A
Patent Literature 2: JP 2014-53069 A
Patent Literature 3: JP 2006-267539 A

SUMMARY OF INVENTION

Technical Problem

Patent Literature 1 discloses, as a technique for recording holograms with a high density, the technique for narrowing the intervals of neighboring holograms by condensing the signal beam by a lens and placing an aperture at the beam waist of the beam, and increasing recording density and capacity compared to a conventional angular multiplexing recording method.

Furthermore, Patent Literature 2 discloses, an example, a two-dimensional encoding method in which a lower limit value of the number of consecutive ON/OFF pixels in an array in a predetermined direction of pixels in a spatial light modulator is K ($K \geq 2$, K: a natural number), and the lower limit value in an array at least in either one direction at the time of encoding, and a technique for reducing the size of a hologram and increasing recording density and capacity by changing the size of an aperture according to the values of K and L.

In other words, the size of an aperture determines the size of a hologram to be recorded in a medium in practice, and the size of the aperture is required to be smaller to reduce the size and record the hologram which can be reduced in size by two-dimensional encoding. However, inter-code interference becomes larger as the size of the aperture becomes smaller for high-density recording.

As an equalization technique for reducing influence of the inter-code interference, Patent Literature 3 discloses a technique for selecting a filter coefficient based on a pattern of binarized data subjected to temporary determination to efficiently eliminate the inter-code interference which an equalizing target pixel receives from peripheral pixels. Although there is a problem that the circuit scale is increased when the peripheral pixels causing the inter-code interference to the target pixel exist in a wide region or when the number of filter coefficients is increased to efficiently eliminate the influence of the inter-code interference in the case that the interference is different in directions, the equalization processing disclosed in Patent Literature 3 does not teach a method for calculating the number of filter coefficients and a peripheral pixel region (hereinafter, referred to as a filter shape) used in equalization processing to the target pixel.

Thus, a purpose of the present invention is to restrain a circuit scale without deteriorating the performance of equalization processing by using a filter shape for equalization processing suitable for reproducing high-density recorded holograms.

Solution to Problem

The above problem is to be solved by, for example, a configuration described below.

An optical information recording/reproducing device which records an interference pattern between a reference beam and a signal beam as a hologram in an optical information storage medium or reproduces information from the optical information storage medium, the optical information recording/reproducing device includes a light source unit which emits a light beam, a signal-beam/reference-beam optical unit which generates the signal beam and the reference beam from the light beam and irradiates the optical information storage medium, a spatial light modulator which adds information to the generated signal beam, a photodetection unit which detects a reproduced beam from the optical information storage medium and acquires a reproduced image constituted by a plurality of pixels arrayed in a lattice shape, and a signal processing unit which performs, based on an array rule of ON pixels or OFF pixels in the spatial light modulator, equalization processing to a first pixel of the reproduced image to have a target characteristic using a filter used to equalize the first pixel and having a filter shape which is an arrange shape of the first pixel and peripheral pixels of the first pixel, in which the filter shape has a different number of coefficient in a first direction from the number of coefficients in a second direction perpendicular to the first direction.

Advantageous Effects of Invention

According to the present invention, it is possible to restrain a circuit scale or reduce an operation processing load without deteriorating the performance of equalization processing when reproducing high-density recorded holograms.

BRIEF DESCRIPTION OF DRAWINGS

FIG. 8a is a flowchart showing an operational procedure of the signal generating circuit in the present embodiment.

FIG. 8b is a flowchart showing an operational procedure of the signal processing circuit in the present embodiment.

FIG. 11a is a diagram showing an example of a filter shape determination method in the present embodiment.

FIG. 11b is a diagram showing an example of a filter shape determination method when different pixel response in an X or a Y direction is indicated in the present embodiment.

FIG. 12a is a diagram showing an example of a filter shape in the present embodiment.

FIG. 12b is a diagram showing a configuration example of a filtering circuit in the present embodiment.

FIG. 13a is a diagram showing an example of a filter shape determination method in the present embodiment.

FIG. 13b is a diagram showing an example of a filter shape determination method in the present embodiment.

DESCRIPTION OF EMBODIMENTS

Embodiments of the present invention are described below with reference to the drawings.

First Embodiment

Figure 2:
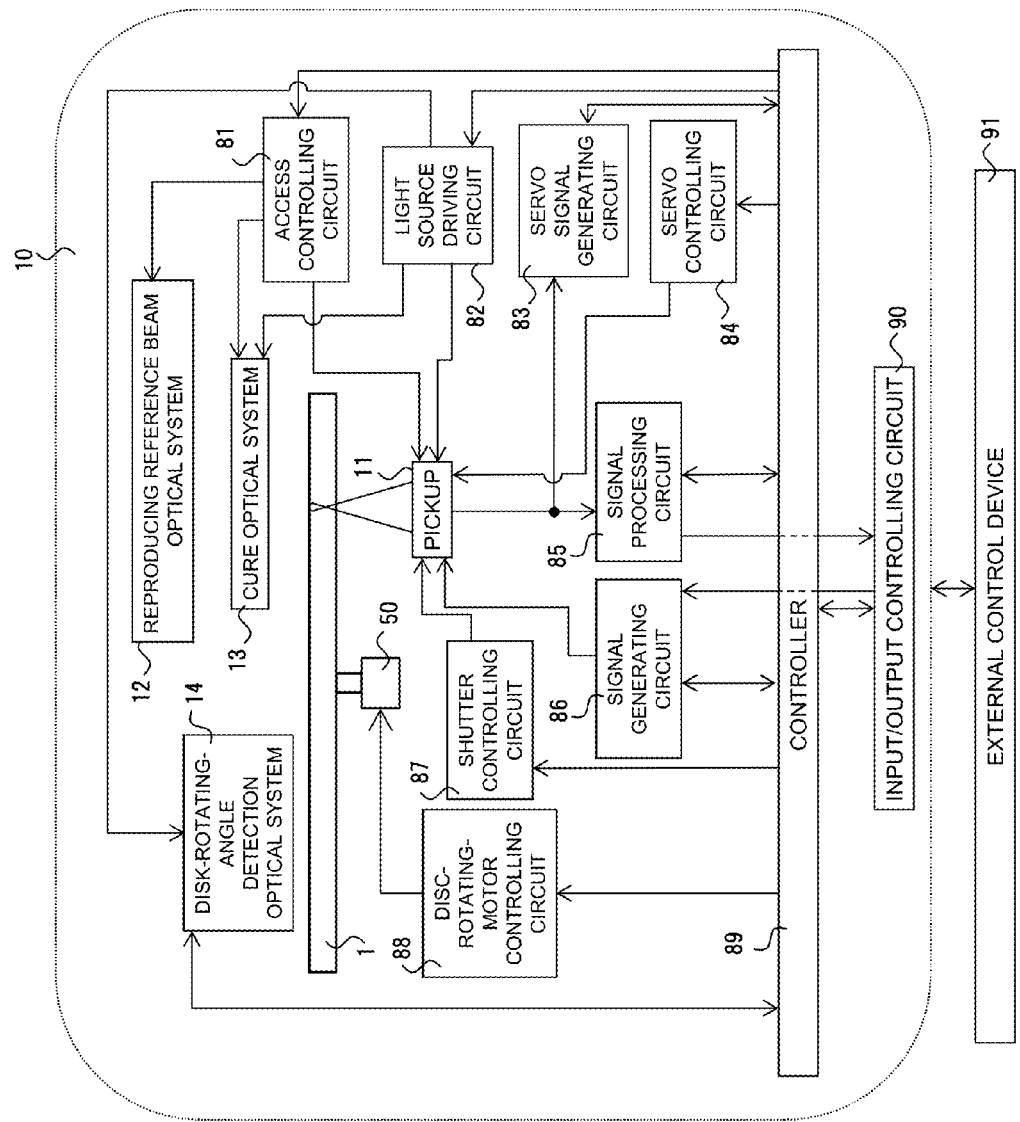
FIG. 2 is a diagram showing a configuration example of an optical information recording/reproducing device in the present embodiment.

FIG. 2 is a block diagram showing a recording/reproducing device, which records or reproduces digital information using holography, for an optical information storage medium.

An optical information recording/reproducing device 10 is connected with an external control device 91 through an input/output controlling circuit 90. At the time of recording, the optical information recording/reproducing device 10 receives an information signal to be recorded from the external control device 91 thorough the input/output controlling circuit 90. At the time of reproducing, the optical information recording/reproducing device 10 transmits a reproduced information signal to the external control device 91 thorough the input/output controlling circuit 90.

The optical information recording/reproducing device 10 includes a pickup 11, a reproducing-reference-beam optical system 12, a cure optical system 13, a disk-rotating-angle detection optical system 14, and a rotating motor 50, and an optical information storage medium 1 is configured so as to be rotatable by the rotating motor 50.

The pickup 11 stores digital information in a storage medium using holography by irradiating the optical information storage medium 1 with a reference beam and a signal beam. At this time, the information signal to be recorded is transmitted to a spatial light modulator in the pickup 11 by a controller 89 through the signal generating circuit 86, and the signal beam is modulated by the spatial light modulator.

When information recorded in the optical information storage medium 1 is to be reproduced, the reproducing-reference-beam optical system 12 generates a light wave which causes the reference beam emitted from the pickup 11 to enter the optical information storage medium in a direction opposite to the direction at the time of recording. A photodetector, which is to be described later, in the pickup 11 detects a reproduced beam to be reproduced by a reproducing reference beam, and a signal processing circuit 85 reproduces the signal.

The irradiation time of the optical information storage medium 1 irradiated with the reference beam and the signal beam irradiating can be adjusted by controlling the opening/closing time of a shutter in the pickup 11 by the controller 89 through a shutter controlling circuit 87.

The cure optical system 13 generates a light beam to be used for pre-curing and post-curing the optical information storage medium 1. The pre-curing is pre-processing in which a desired position of the optical information storage medium 1 is irradiated with a predetermined light beam before the desired position is irradiated with the reference beam and the signal beam to record information at the desired position. The post-curing is post-processing in which a desired position of the optical information storage medium 1 is irradiated with a predetermined light beam after information is recorded at the desired position not to add further information to the desired position.

The disk-rotating-angle detection optical system 14 detects the rotation angle of the optical information storage medium 1. In order to adjust the optical information storage medium 1 to a predetermined rotation angle, the disk-rotating-angle detection optical system 14 detects a signal according to the rotation angle, and the controller 89 controls, through the disc-rotating-motor controlling circuit 88, the rotation angle of the optical information storage medium 1 using the detected signal.

A light source driving circuit 82 provides predetermined light source driving current to light sources in the pickup 11, the cure optical system 13, and the disk-rotating-angle detection optical system 14, and each light source can emit a light beam with a predetermined amount of light.

Furthermore, the pickup 11, and a disc cure optical system 13 each have a mechanism for sliding its position in a radius direction of the optical information storage medium 1, and the position control is performed through an access controlling circuit 81.

Incidentally, a recording technique using the principle of angular multiplexing in holography tends to have an extremely small allowable error with respect to shift of a reference beam angle.

Thus, it is necessary to provide, in the pickup 11, a mechanism for detecting an amount of shift of a reference beam angle, generate a servo control signal by a servo signal generating circuit 83, and provide a servo mechanism for correcting the amount of shift through a servo controlling circuit 84 in the optical information recording/reproducing device 10.

Furthermore, some or all of the optical system configurations of the pickup 11, the cure optical system 13, and the disk-rotating-angle detection optical system 14 may be integrated for simplification.

Figure 3:
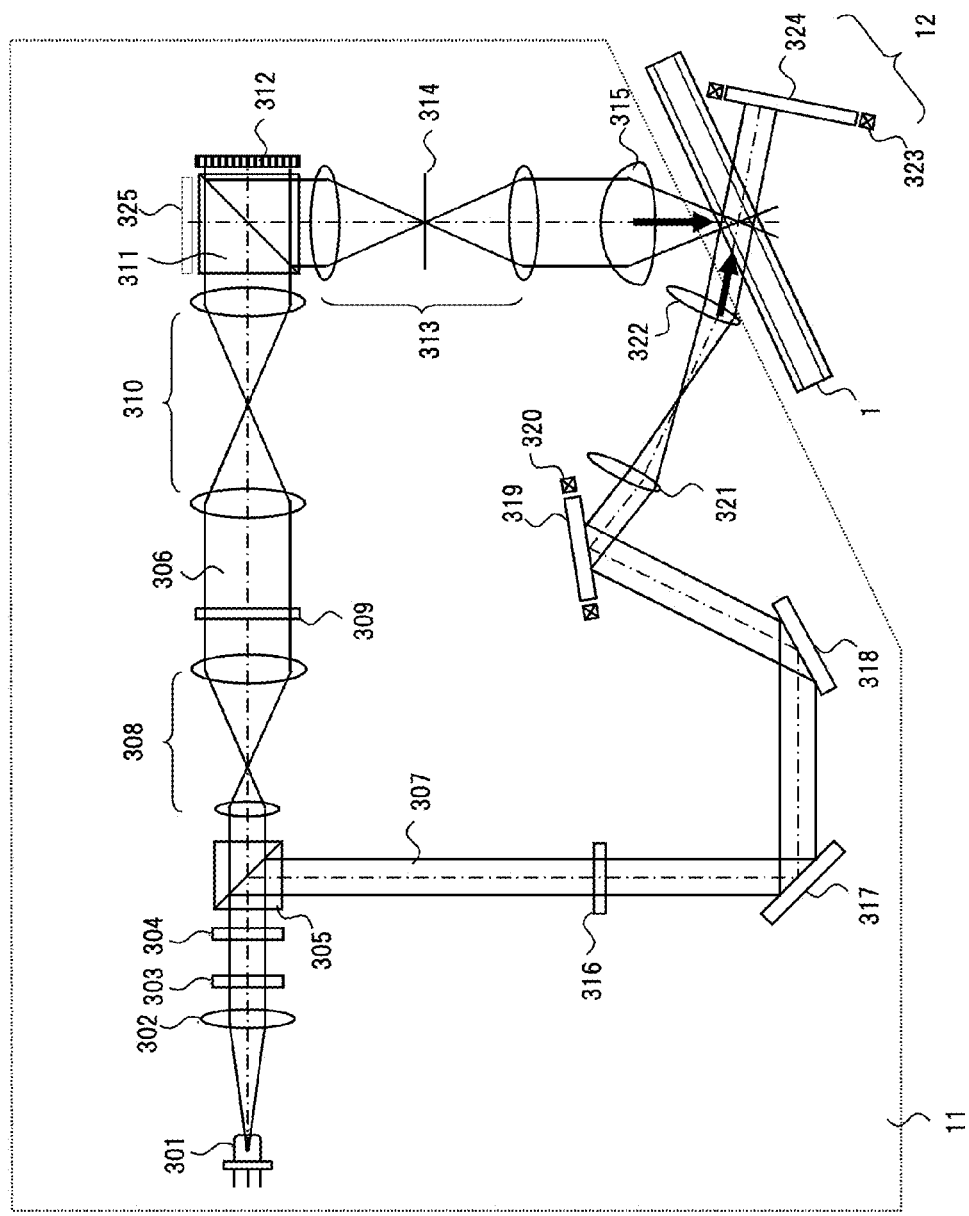
FIG. 3 is a diagram showing a configuration example of an optical pickup in the present embodiment.

FIG. 3 shows a recording principle in an example of a basic optical system configuration of the pickup 11 in the optical information recording/reproducing device 10. A light beam emitted from a light source 301 passes through a collimator lens 302 and enters a shutter 303. After the light beam passes through the shutter 303 when the shutter 303 is opened, the polarizing direction of the light beam is controlled by an optical element 304 constituted by, for example, a half-wave plate so that the ratio of the light amount of p-polarization and s-polarization is to be a desired ratio, and then the light beam enters a polarization beam splitter (PBS) prism 305.

The light beam passing through the PBS prism 305 serves as a signal beam 306, and the diameter of the light beam is expanded by a beam expander 308. Then, the light beam passes through a phase mask 309, a relay lens 310, and a PBS prism 311, and enters a spatial light modulator 312.

The signal beam to which information is added by the spatial light modulator 312 is reflected by the PBS prism 311, and propagates through a relay lens 313 and an aperture 314. Thereafter, the signal beam is condensed by an objective lens 315 on the optical information storage medium 1.

On the other hand, the light beam reflected by the PBS prism 305 serves as a reference beam 307, is set in a predetermined polarizing direction by a polarizing-direction conversion element 316 according to the time of recording or reproducing, passes through a mirror 317 and a mirror 318, and enters a galvanometer mirror 319. The angle of the galvanometer mirror 319 can be adjusted by an actuator 320, and the angle of incidence of the reference beam to pass through a lens 321 and a lens 322 and to enter the optical information storage medium 1 can be set at a desired angle. Note that, to set the angle of incidence of the reference beam, an element which converts the wavefront of the reference beam may be used instead of a galvanometer mirror.

By causing the signal beam and the reference beam to enter the optical information storage medium 1 so as to overlap each other, an interference pattern is formed in the storage medium, and the information is recorded by writing the pattern in the storage medium. Furthermore, since the angle of incidence of the reference beam to enter the optical information storage medium 1 can be changed by the galvanometer mirror 319, it is possible to perform recording by angular multiplexing.

Hereinafter, in holograms recorded by changing reference beam angles in the same region, a hologram corresponding to each individual reference beam angle is referred to as a page, and a set of pages recorded by angular multiplexing in the same region is referred to as a book.

Figure 4:
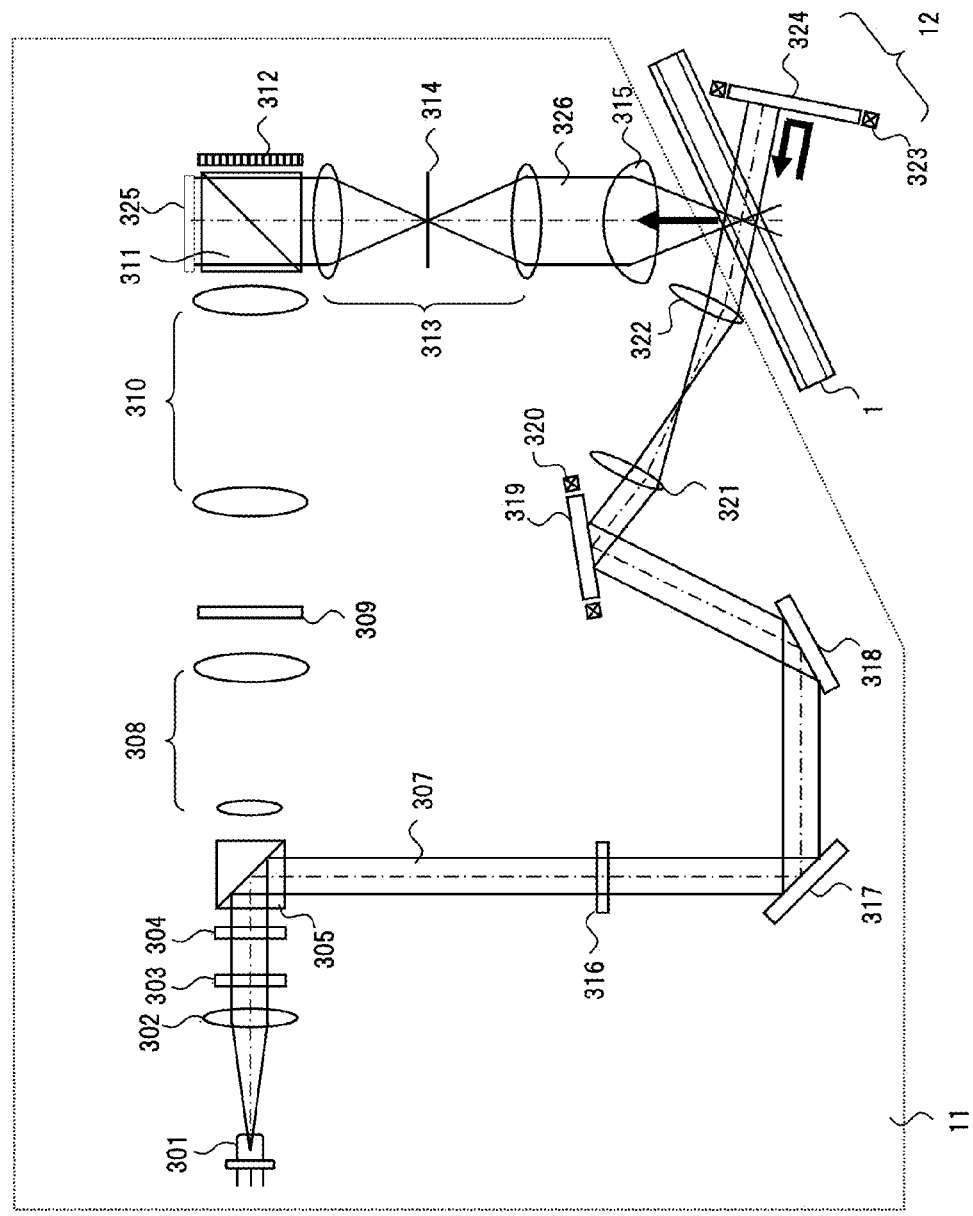
FIG. 4 is a diagram showing a configuration example of the optical pickup in the present embodiment.

FIG. 4 shows a reproducing principle in an example of a basic optical system configuration of the pickup 11 in the optical information recording/reproducing device 10. To reproduce the recorded information, as described above, by causing the reference beam to enter the optical information storage medium 1 and the light beam passing through the optical information storage medium 1 to be reflected by a galvanometer mirror 324 the angle of which can be adjusted by an actuator 323, the reproducing reference beam is reproduced.

The reproduced beam reproduced by the reproducing reference beam propagates through the objective lens 315, the relay lens 313, and the aperture 314. Thereafter, the reproduced beam passes through the PBS prism 311 and enters a photodetector 325, and the recorded signal is reproduced. As the photodetector 325, an image sensor, such as a CMOS image sensor or a CCD image sensor, can be used, but any sensor may be used as long as it can reproduce page data.

FIGS. 5*a* to 5*c* show operational procedures of recording and reproducing in the optical information recording/reproducing device 10. Here, procedures especially related to recording and reproducing using holography are described.

Figure 5:
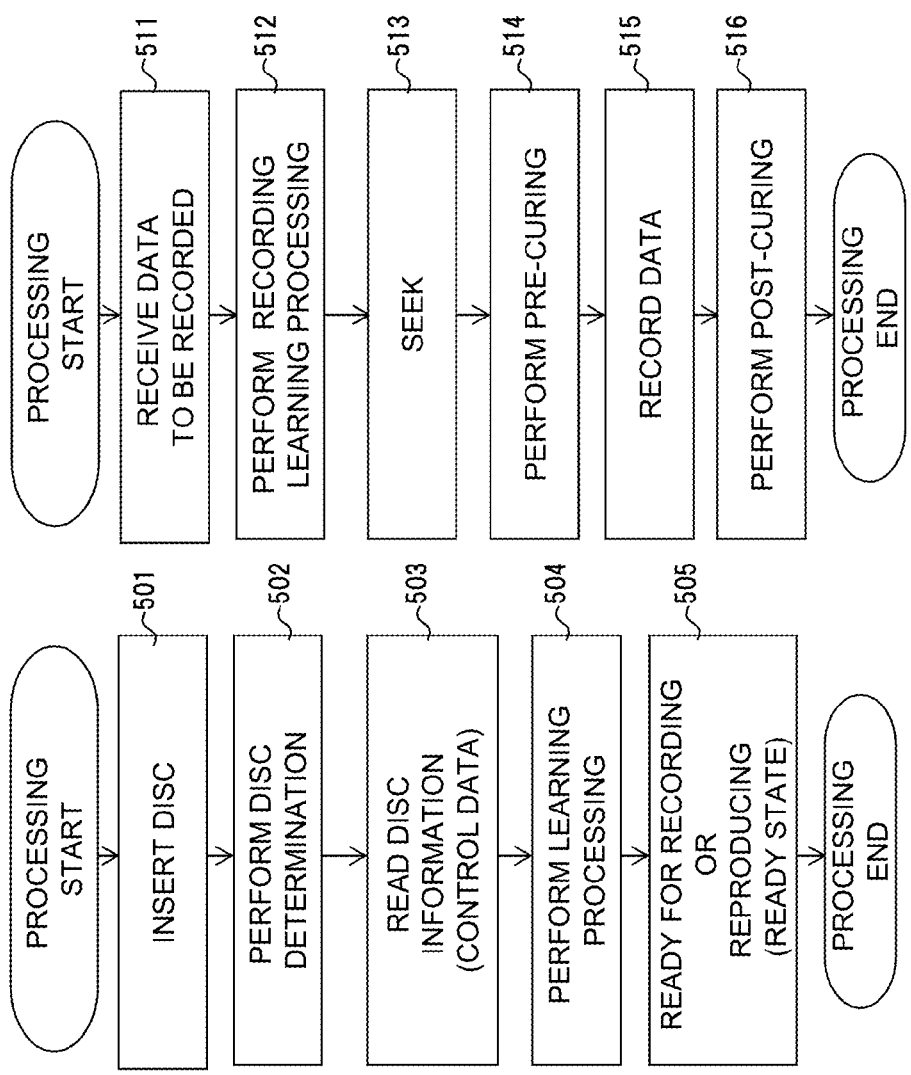
FIG. 5a is a flowchart showing an operational procedure of the optical information recording/reproducing device in the present embodiment.
FIG. 5b is a flowchart showing an operational procedure of the optical information recording/reproducing device in the present embodiment.
FIG. 5c is a flowchart showing an operational procedure of the optical information recording/reproducing device in the present embodiment.

FIG. 5*a* shows an operational procedure from insertion of the optical information storage medium 1 to the optical information recording/reproducing device 10 until recording or reproducing is ready. FIG. 5(*b*) shows an operational procedure from a ready state until information is recorded in the optical information storage medium 1. FIG. 5(*c*) shows an operational procedure from a ready state until the information recorded in the optical information storage medium 1 is reproduced.

As shown in FIG. 5*a*, when a medium is inserted (501), the optical information recording/reproducing device 10 performs disc determination as to whether, for example, the inserted medium is a medium in which digital information is recorded or reproduced by using holography (502).

As a result of the disc determination, when determining that the medium is an optical information storage medium in which digital information is recorded or reproduced using holography, the optical information recording/reproducing device 10 reads control data in the optical information storage medium (503), to acquire, for example information on the optical information storage medium and information related to various setting conditions in, for example, recording or reproducing.

By performing various types of adjustment according to the control data or learning processing related to the pickup 11 (504), the optical information recording/reproducing device 10 is ready for recording or reproducing (505).

In the operational procedure from the ready state until the information is recorded, as shown in FIG. 5b, first, data to be recorded is received (511), and the information corresponding to the data is transmitted to the spatial light modulator in the pickup 11.

Thereafter, in order to record information in the optical information storage medium with high quality, various types of recording learning processing, such as the power optimization of the light source 301 or exposure time optimization by a shutter 303, is performed in advance (512).

Thereafter, in a seek operation (513), the access controlling circuit 81 is controlled so that the pickup 11 and the cure optical system 13 are positioned at predetermined positions of the optical information storage medium. When the optical information storage medium 1 has address information, the address information is reproduced to confirm whether the pickup 11 and the cure optical system 13 are positioned at the predetermined positions. If the pickup 11 and the cure optical system 13 are not positioned at the predetermined positions, the amount of shift from each predetermined position is calculated and the positioning operation is repeated.

Thereafter, a predetermined region is pre-cured using the light beam emitted from the cure optical system 13 (514), and the data is recorded using the reference beam and signal beam emitted from the pickup 11 (515).

After the data is recorded, the post-curing performed using the light beam emitted from the cure optical system 13 (516). The data may be verified as needed.

In the operational procedure from the ready state until the recorded information is reproduced, as shown in FIG. 5c, first, the access controlling circuit 81 is controlled so that the pickup 11 and the reproducing-reference-beam optical system 12 are positioned at the predetermined positions of the optical information storage medium in the seek operation (521). When the optical information storage medium 1 has address information, the address information is reproduced to confirm whether the pickup 11 and the cure optical system 13 are positioned at the predetermined positions. If the pickup 11 and the cure optical system 13 are not positioned at the predetermined positions, the amount of shift from each predetermined position is calculated and the positioning operation is repeated.

Thereafter, the pickup 11 emits the reference beam to read the information recorded in the optical information storage medium (522), and the reproduced data is transmitted (523).

Next, with reference to FIGS. 6 to 8b, signal generation and processing at the time of recording and reproducing are described.

Figure 6:
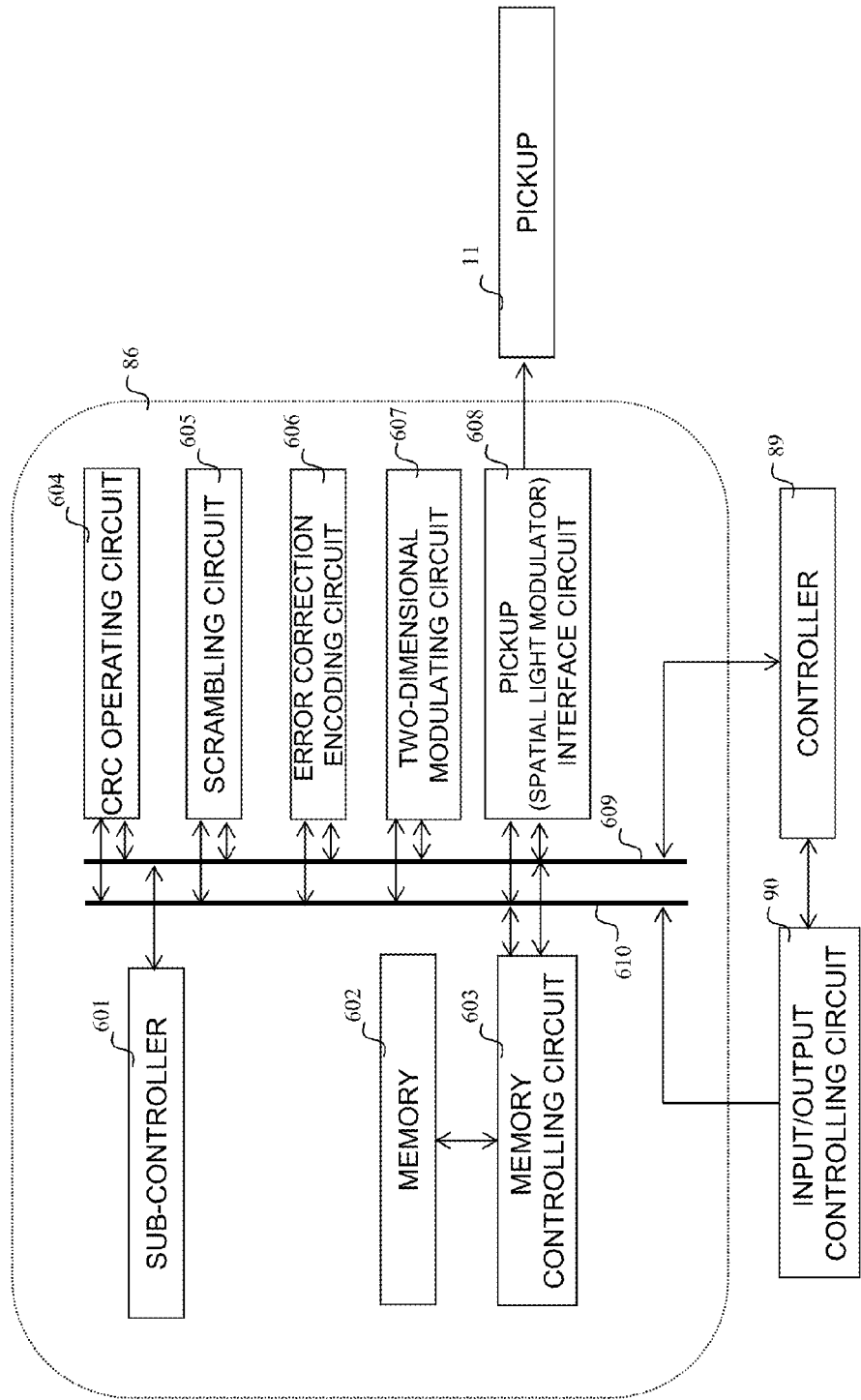
FIG. 6 is a diagram showing a configuration example of a signal generating circuit in the present embodiment.

First, with reference to FIGS. 6 and 8a, a configuration of the signal generating circuit 86 of the optical information recording/reproducing device 10 and record data processing when data is recorded are described.

FIG. 6 is a block diagram of the signal generating circuit 86 of the optical information recording/reproducing device 10. FIG. 8a shows a procedure of data processing in the signal generating circuit 86 at the time of recording, specifically, a procedure for generating two-dimensional data to be recorded from user data in a medium.

Figure 9A:
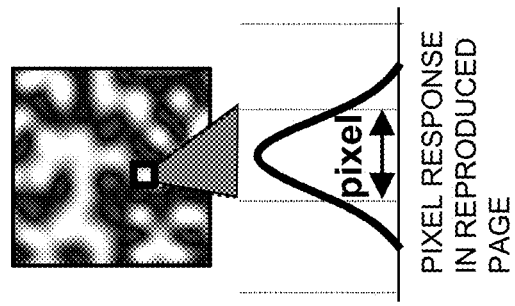
FIG. 9a is a diagram showing a pixel response waveform in a recorded page in the present embodiment.

In the two-dimensional data, a plurality of pixels is arrayed in a lattice shape, and the data is expressed by a pixel having high brightness (white) and a pixel having low brightness (black) as shown in FIG. 9a and the like. Hereinafter, the pixel having high brightness is referred to as an ON pixel, and the pixel having low brightness is referred to as an OFF pixel.

When input of the user data to an input/output controlling circuit 90 is started, the input/output controlling circuit 90 notifies the controller 89 that the input of the user data has been started. The controller 89 controls, in response to the notification, the signal generating circuit 86 to record one page of data input from the input/output controlling circuit 90.

When the signal generating circuit 86 receives the user data (801), the processing instruction from the controller 89 is notified to a sub-controller 601 in the signal generating circuit 86 through a control line 609.

The sub-controller 601 controls, in response to the notification, the signal processing circuits through the control line 609 so that the signal processing circuits operate in parallel.

A memory controlling circuit 603 performs control so as to store the user data input from the input/output controlling circuit 90 through a data line 610 in a memory 602.

When the user data stored in the memory 602 reaches a certain amount, a CRC operating circuit 604 divides the user data into a plurality of data strings, and CRC-encodes each data string to detect errors at the time of reproducing (802).

A scrambling circuit 605 substantially equalizes the number of ON pixels with the number of OFF pixels, and performs scrambling for adding a pseudo-random data string to each CRC-encoded data string to prevent repetition of the same pattern (803).

An error correction encoding circuit 606 performs error correction encoding for adding a parity data string such as a Reed-Solomon code to correct errors at the time of reproducing (804).

A two-dimensional modulating circuit 607 performs two-dimensional modulation based on the modulation rule so that the lower limit value of the number of consecutive ON/OFF pixels (hereinafter, referred to as the number of consecutive pixels) is to be L (L≥2, L: a natural number) when using the two-dimensional encoding method disclosed in Patent Literature 2 (805).

A pickup interface circuit 608 forms one page of two-dimensional data by performing conversion into M×N two-dimensional data and repeating the conversion for one page (806), adds to the formed two-dimensional data a marker which is a standard for image position detection or image distortion correction to be performed at the time of reproducing (807), and transfers the data to the spatial light modulator 312 (808).

Note that, a direction to which the lower limit value in the two-dimensional encoding is set may be one direction of a predetermined direction (hereinafter, referred to as a first direction), and a lower limit value K (K≥2, K: a natural number) of the number of consecutive pixels may be set to a direction perpendicular to the predetermined direction (hereinafter, referred to as a second direction). By setting the lower limit value to two directions, it is possible to further reduce the size of a hologram.

Figure 7:
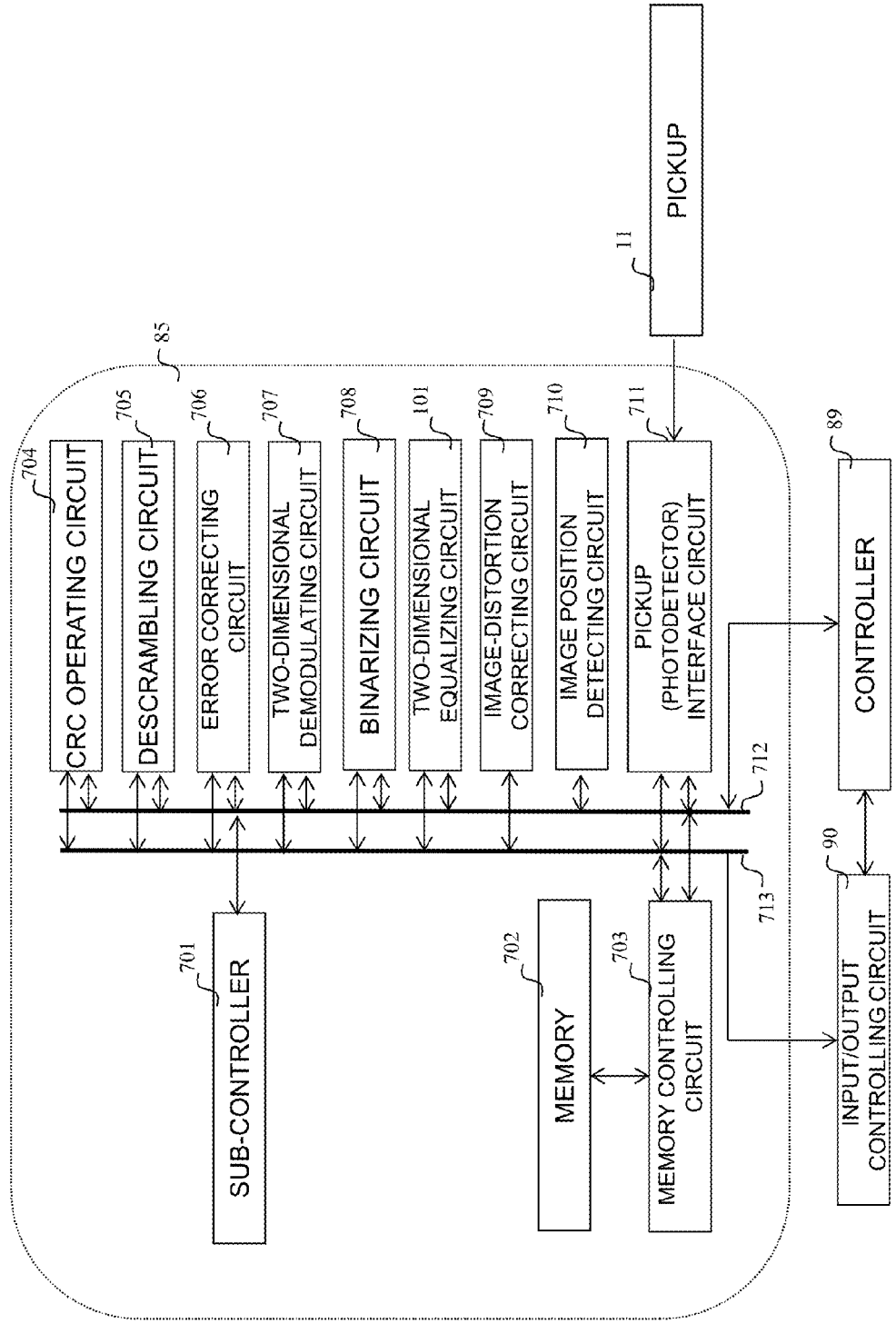
FIG. 7 is a diagram showing a configuration example of a signal processing circuit in the present embodiment.

Next, with reference to FIGS. 7 and 8*b*, a configuration of the signal processing circuit 85 of the optical information recording/reproducing device 10 and reproduced data processing when data is reproduced are described.

FIG. 7 is a block diagram of the signal processing circuit 85 of the optical information recording/reproducing device 10. FIG. 8*b* is a flowchart of data processing procedure in the signal processing circuit 85 at the time of reproducing.

When the photodetector 325 in the pickup 11 detects image data (811), the controller 89 controls the signal processing circuit 85 to reproduce one page of data input from the pickup 11.

The processing instruction from the controller 89 is notified to a sub-controller 701 in the signal processing circuit 85 through a control line 712. The sub-controller 701 controls, in response to the notification, the signal processing circuits through the control line 712 so that the signal processing circuits operate in parallel.

A memory controlling circuit 703 performs control so as to store, through a data line 713, the image data input from the pickup 11 through pickup interface circuit 711 in a memory 702.

When the data stored in the memory 702 reaches a certain amount, an image position detecting circuit 710 detects the image position from the image data stored in the memory 702 based on the marker (812).

An image-distortion correcting circuit 709 performs distortion correction for inclination, magnification, distortion, and the like of the image using the detected marker (813), and converts the image data to a desired two-dimensional data size.

A two-dimensional equalizing circuit 101 eliminates the inter-code interference of the converted two-dimensional data (814).

A binarizing circuit 708 binarizes each bit data of a plurality of bits constituting the two-dimensional data to determine each bit as "0" or "1" (815), and stores the data in the memory 702 in the order of the output of the reproduced data.

A two-dimensional demodulating circuit 707 removes the marker (816), and thus acquires one page of two-dimensional data (817), and performs two-dimensional demodulating to the modulated and recorded data in accordance with the modulation rule used at the time of modulating (818).

An error correcting circuit 706 converts the two-dimensional data acquired in this manner to a plurality of data strings, performs error correction processing to errors contained in each data string (819), and removes a parity data string.

A descrambling circuit 705 releases scramble which adds a pseudo-random data string (820).

A CRC operating circuit 704 performs error detection processing based on the CRC (821) to delete a CRC parity, confirms that the user data in the memory 702 has no error, and transfers the user data from the memory 702 to the input/output controlling circuit 90 (822).

Here, in the optical information recording/reproducing device according to the present embodiment described above, two-dimensional equalization which is a feature of the present embodiment is described in detail with reference to FIGS. 1, and 9*a* to 12*b*.

In the present embodiment, by determining a filter shape according to the lower limit value of the number of consecutive pixels subjected to the two-dimensional encoding which is a factor causing inter-code interference, and performing two-dimensional equalization using the determined shaped filter, the inter-pixel interference is to be compensated and the quality of a reproduced signal is to be improved.

Note that, the filter shape is the shape of a region in which a pixel, which is an equalization target in two-dimensional data (hereinafter, referred to as an equalizing target pixel), and pixels existing around the equalizing target pixel (hereinafter, referred to as peripheral pixels) to be subjected to filtering, such as multiplication of the equalizing target pixel and the peripheral pixels by a filter coefficient, to perform equalization processing are arranged.

Figure 1:
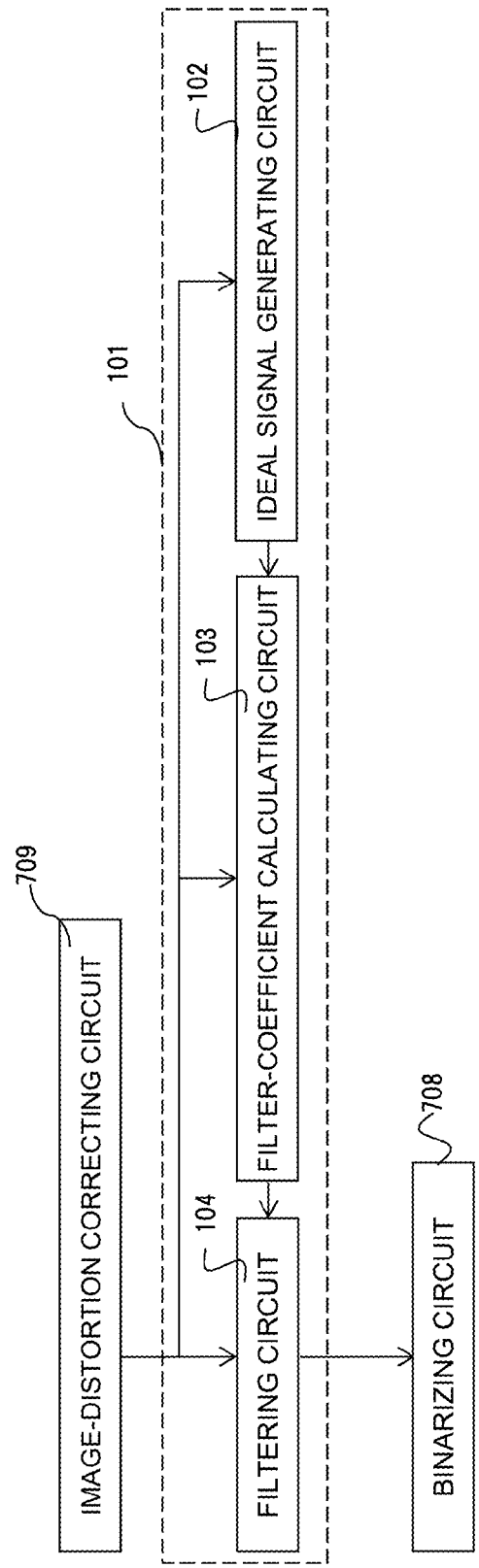
FIG. 1 is a diagram showing a configuration example of a two-dimensional equalizing circuit in the present embodiment.

First, the two-dimensional equalizing circuit 101 in a first embodiment is described with reference to FIG. 1. FIG. 1 shows a configuration of the two-dimensional equalizing circuit 101 in the first embodiment.

The image data positioned by the image-distortion correcting circuit 709 is transferred to a filter-coefficient calculating circuit 103, and an optimal filter coefficient is calculated (learned) for each page. However, a signal to be a target (hereinafter, referred to as an ideal signal) is required in the filter-coefficient calculating circuit 103 to calculate an optimal filter coefficient. Thus, the output of the image-distortion correcting circuit 709 is simultaneously transferred to the ideal signal generating circuit 102 to be binarized, and then transferred to a filter-coefficient calculating circuit 103 as the ideal signal.

The filter-coefficient calculating circuit 103 calculates the filter coefficient using, for example, an adaptive algorithm such as a linear minimum mean squared error (LMMSE). The LMMSE is an algorithm for calculating a filter coefficient when a squared error between the equalized signal and the ideal signal is minimum. Note that, the algorithm used as an adaptive algorithm may be other algorithms other than the LMMSE.

A filtering circuit 104 performs filtering using the filter coefficient calculated by the filter-coefficient calculating circuit 103, and transfers the output to the binarizing circuit 708.

Next, a factor causing inter-code interference is described with reference to FIGS. 9*a* and 9*b*.

FIG. 9*a* shows a recorded page, that is, an example of a spatial-light-modulator display pattern and the pixel response waveform thereof. The spatial-light-modulator display pattern is expressed by two values of an ON pixel and an OFF pixel, and the pixel response waveform is like a square wave.

Figure 9B:
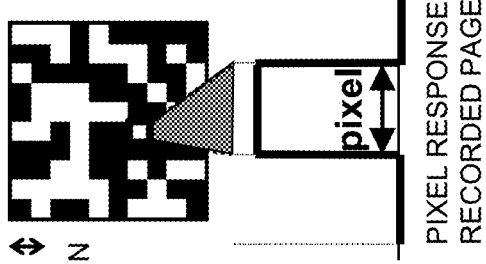
FIG. 9b is a diagram showing a pixel response waveform in a reproduced page in the present embodiment.

However, when the recorded page is reproduced, the signal leaks from the ON pixel to the adjacent pixels, which causes the inter-code interference, and the pixel response waveform is distorted as shown in FIG. 9*b*. This is because that an aperture which narrows the beam waist of the reproduced beam eliminates high-frequency components, and the inter-code interference becomes larger as the size of the aperture becomes smaller.

Figure 10B:
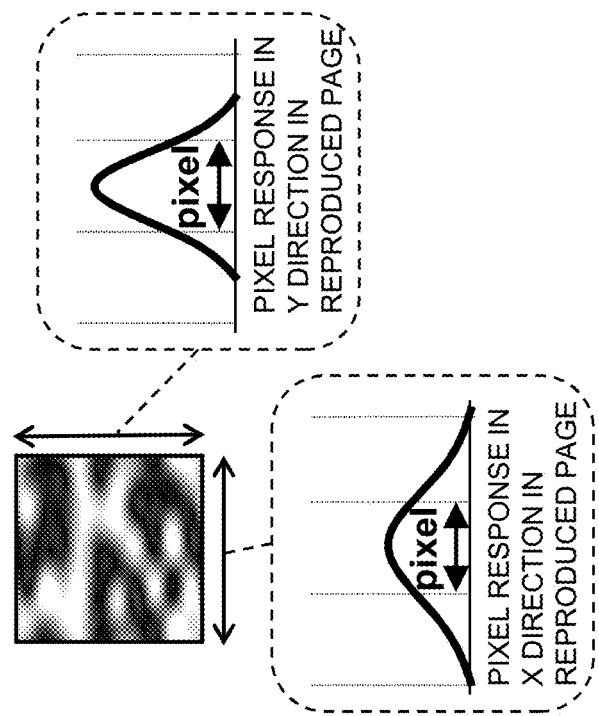
FIG. 10b is a diagram showing pixel response waveforms each indicating different response in an X or a Y direction in a reproduced page in the present embodiment.
Figure 10A:
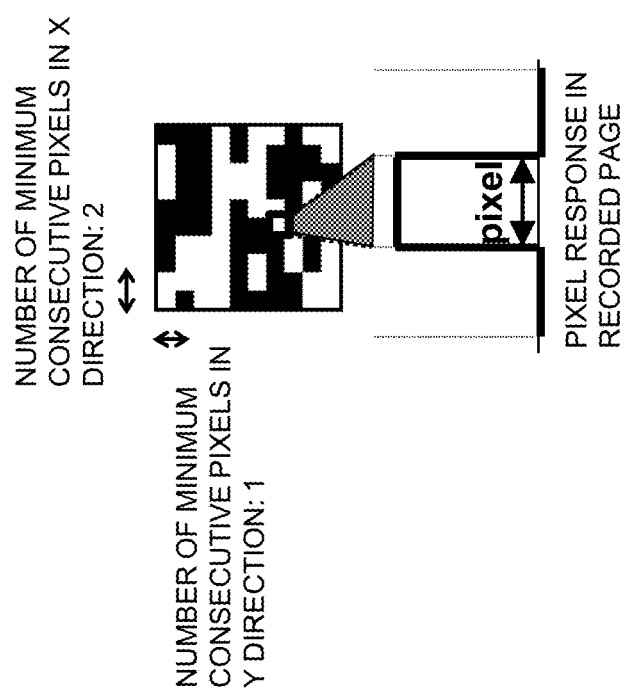
FIG. 10a is a diagram showing a pixel response waveform in a recorded page in the present embodiment.

FIGS. 10*a* and 10*b* show examples in which influence of inter-code interference is different in an X or a Y direction. An example in which influence of inter-code interference is different in an X or a Y direction can be the case in which the lower limit value of the number of consecutive pixels subjected to the two-dimensional encoding in the X direction is different from that in the Y direction.

FIG. 10*a* shows a recorded page encoded by setting the lower limit value of the number of consecutive pixels in the X direction is 2 and the lower limit value in the Y direction is 1 when a hologram is recorded. If the size of the hologram is reduced using the smaller size of the aperture in the X direction than that in the Y direction, the inter-code interference in the X direction is increased with respect to the Y direction, and the distortion of the pixel response waveform is increased as shown in FIG. 10b.

Here, if a filter in the equalization processing is set according to the X direction in which the inter-code interference is large, the filter scale is increased. However, as described below, by determining the filter shape used by the filtering circuit 104 of the two-dimensional equalizing circuit 101 according to the spatial-light-modulator display pattern causing the inter-code interference, or the lower limit value of the number of consecutive pixels subjected to the two-dimensional encoding, the two-dimensional equalization can be performed while the operation amount is restrained.

With reference to FIGS. 11a and 11b, an example of a filter shape determination method in the present embodiment is described.

FIGS. 11a and 11b show spatial-light-modulator display patterns and examples of filter shapes suitable therefor, and it is assumed that the lower limit value of the number of consecutive pixels in the X direction is t (t: a natural number), and the lower limit value of the number of consecutive pixels in the Y direction is u (u: a natural number).

FIG. 11a shows a spatial-light-modulator display pattern 1101 when it is assumed that t=u=1. In this case, the inter-code interference in a reproduced image 1102 does not have the X or Y directivity, and the inter-code interference occurs at the pixels of the lower limit value of the number of consecutive pixels centered at a target pixel, which is the equalizing target pixel, and existing in each of the X direction and the Y direction.

Thus, by using the filter shape 1103 having a size of X direction: 2×t+1=3 and Y direction: 2×u+1=3, it is possible to sufficiently compensate the inter-code interference, and to acquire an equalized image 1104.

FIG. 11b shows a spatial-light-modulator display pattern 1105 when it is assumed that t=2 and u=1. In this case, the inter-code interference largely occurs in the X direction with respect to the Y direction in a reproduced image 1106.

Thus, in the case of FIG. 11b, by using the filter shape 1107 having a size of X direction: 2×t+1=5 and Y direction: 2×u+1=3, it is possible to compensate the inter-code interference, and to acquire an equalized image 1108.

Consequently, although the influence of the inter-code interference in the X direction differs from that in the Y direction, it is possible to calculate the number of filter coefficients (hereinafter, a filter size) suitable for each direction, and to calculate the minimum filter shape.

In the present embodiment, the filter size is defined as X direction: 2×s×t+1 and Y direction: 2×s×u+1 (s: a natural number) and calculated with the value of s=1. However, any calculating formula may be used as long as the size is to be changed according to the lower limit value of the number of consecutive pixels. For example, when the inter-code interference is large, by assuming that s=2 and the size is to be 2×2×u+1, the inter-code interference twice as large as the present embodiment can be handled.

Furthermore, although the filter shape is determined based on the lower limit value of the number of consecutive pixels subjected to the two-dimensional encoding in the present embodiment, the filter shape may be determined based on the size of the aperture. This is because that, as described above, the size of the aperture is desirably to be determined based on the lower limit value of the number of consecutive pixels subjected to the two-dimensional encoding disclosed in Patent Literature 2.

For example, when the lower limit value of the number of consecutive pixels is set as L in the first direction and as K in the second direction, the size of the aperture is to be 1/L in the first direction and 1/K in the second direction in comparison with the case in which the lower limit values of the number of consecutive pixels both in the first direction and the second direction are 1, that is, the case in which the two-dimensional encoding method of Patent Literature 2 is not used. Naturally, the lower limit value may be set to both or either of the first direction and/or the second direction.

Thus, the calculating formulas for the filter size according to the size of the aperture designed as described above are first direction: 2×s×t+1, and second direction: 2×s×u+1.

Furthermore, as another factor determining the filter shape, the size of the aperture or, the ratio of, for example, the Nyquist frequency size calculated from the pixel pitch of the spatial light modulator may be used. In this case, since the inter-code interference becomes larger according to the reciprocal of the Nyquist-frequency-space ratio of the aperture, when it is assumed that the Nyquist-frequency-space ratio of the size of the aperture in the X direction is m (m: a real number greater than 0), and the Nyquist-frequency-space ratio of the size in the Y direction is n (n: a real number greater than 0), the inter-code interference can be compensated by setting the filter size in the X direction as 1/m×2×s+1 and the filter size in the Y direction as 1/n×2×s+1.

In addition, the size of a condensed signal beam or the size of a hologram to be recorded may be used. In this case, when it is assumed that the size of the signal beam or the hologram to be recorded in the X direction is m (m: a real number greater than 0), and the size in the Y direction is n (n: a real number greater than 0), the inter-code interference can be compensated by setting the filter size in the X direction as 1/m×2×s+1 and the filter size in the Y direction as 1/n×2×s+1.

Consequently, although the page size is two-dimensionally variable or when the size of the hologram is reduced without the aperture, filtering can be performed with an optimal filter shape.

Note that, since the filter size needs to be a natural number greater than 1, the value calculated with the above formula is to be rounded up if the value is not a natural number greater than 1.

FIGS. 12a and 12b show an example of processing for multiplying a filter coefficient having different length in the X or the Y direction with the two-dimensional data in the filtering circuit 104 of the two-dimensional equalizing circuit 101. For example, the case in which filtering is performed to the brightness value of an equalizing target pixel which is the center of a 5×3 filter region as shown in FIG. 12a is described.

In the filtering, the filter coefficient is multiplied with the brightness value of each of the equalizing target pixel and peripheral pixels 1 to 14 by a multiplier 1201, and the filtered value is calculated by adding all the values by an adder 1202 as shown in FIG. 12b. In this case, the necessary number of filter coefficient values is 15.

As described above, according to the present embodiment, it is possible to perform the two-dimensional equalization with the minimum operation amount using the filter shape according to the lower limit value of the number of consecutive pixels subjected to the two-dimensional encoding. Consequently, it is possible to reduce the number of the multipliers 1201 to the minimum, and to restrain the circuit scale without deteriorating the performance of the two-dimensional equalization.

By restraining the circuit scale, it is also possible to arrange the circuits of the equalization processing unit in parallel. In this case, it is possible to form a circuit which can perform high-speed processing without increasing the circuit scale.

The following modifications are not limited to the present embodiment.

Although the description based on the hologram recording technique in the angular multiplexing recording method has been made in the present embodiment, the present invention is not limited to the angular multiplexing recording method, and is applicable to other hologram recording techniques, such as a shift multiplexing recording method, and signal processing for storage mediums for optical information other than holograms.

Furthermore, although the filter shape having an odd number of the number of coefficients in each of the X direction and the Y direction has been exemplified, the number of coefficients may be an even number, and the equalizing target pixel is not necessarily the center of the filter shape. If the distortion of a pixel response waveform is asymmetric laterally or vertically, an even number can be suitable as the number of coefficients.

Furthermore, the optical information recording/reproducing device may perform over-sampling in which a reproduced image is to be detected using a photodetector which detects a larger number of pixels than the spatial light modulator to improve the precision of the distortion correction. In this case, the image-distortion correcting circuit 709 performs re-sampling processing for converting the over-sampled image to the original reproduced image size.

At this time, the example in which the image distortion correction is performed (813) and then the two-dimensional equalization is performed (814) has been described in the present embodiment as the procedure shown in FIG. 8*b*. However, the two-dimensional equalization may be performed before the image distortion correction. Consequently, it is possible to perform the two-dimensional equalization processing to a reproduced image having a larger number of pixels by calculating the filter coefficient by multiplying the formula for determining the filter shape by the rate of the over-sampling, and performing the two-dimensional equalization to the reproduced image before the image distortion correction.

Furthermore, the optical information recording/reproducing device may perform region division adaptive equalization in which the reproduced image is divided into a plurality of regions having a predetermined size and the two-dimensional equalization processing is performed to each divided region to improve the performance of the two-dimensional equalization processing. By performing the region division adaptive equalization, it is possible to handle the difference of the inter-code interference according to the position in the page.

Furthermore, although the two-dimensional equalization processing in the optical information recording/reproducing device has been described in the present embodiment, the two-dimensional equalization processing may be performed in a device dedicated to reproduction similarly to the above description. In this case, when the lower limit value of the number of consecutive pixels is defined in, for example, the specification, the reproducing device is only required to include a two-dimensional equalizing circuit having a filter the shape of which is determined as the present embodiment based on the lower limit value of the number of consecutive pixels defined by the specification.

Furthermore, although it has been described that the two-dimensional equalization processing is performed in the circuit in the present embodiment, the two-dimensional equalization processing may be performed in a processor. In this case, the operation scale of the processor becomes smaller as the filter size is to be smaller, and the operation processing load can be restrained.

Second Embodiment

The different point of the present embodiment from the first embodiment is that a filter shape is not determined only by the size in the X direction and the Y direction, but is determined using the distance from an equalizing target pixel to be equalized.

As described above, by determining the size of the filter coefficient according to the display pattern on the spatial light modulator, it is possible to restrain the circuit scale and accelerate the operation without deteriorating the performance of the equalization processing.

However, since the influence of inter-code interference two-dimensionally varies according to the distance from the target pixel, the shape of an optimal filter coefficient cannot be determined if the shape of the filter coefficient is determined only by the sizes in the X direction and the Y direction.

In consideration of this, in the present embodiment, by defining the size of a circle or ellipse centered at the target pixel according to the lower limit value of the number of consecutive pixels subjected to the two-dimensional encoding, the shape of a filter coefficient is to be determined.

With reference to FIGS. 13*a* and 13*b*, an example of a method for determining the shape of a filter coefficient in the present embodiment is described.

FIGS. 13*a* and 13*b* show, similarly to FIGS. 11*a* and 11*b*, a spatial-light-modulator display pattern and an example of the suitable filter shape in the present embodiment. FIG. 13*a* shows, similarly to FIG. 11*a*, a spatial-light-modulator display pattern 1101 and a reproduced image 1102 thereof when it is assumed that t=1 and u=1.

Similarly to the first embodiment, when the inter-code interference occurs at the pixels of the lower limit value of the number of consecutive pixels centered at a target pixel and existing in in each of the X direction and the Y direction, a circle 1301 having the size of, for example, radius: t×1=1 from the center of the target pixel centering at the filter region is calculated, and the arrangement of the pixels in which the pixel center is included inside the circle is to be the filter shape. Naturally, since t=u, to calculate the radius, u may be used.

When it is assumed that the arrangement of the pixels included inside the circle is the filter shape, by using a filter coefficient 1302 having a shape in which the pixels are arranged in a cross, it is possible to compensate the inter-code interference.

FIG. 13*b* shows, similarly to FIG. 11*b*, the case in which a spatial-light-modulator display pattern 1105 is used when it is assumed that t=2 and u=1, and a reproduced image 1106 thereof. In this case, since the inter-code interference in the X direction largely occurs compared to the Y direction, when it is assumed that an ellipse 1303 having the size of X direction: t×1=2 and Y direction: u×1=1 is calculated and the arrangement of the pixels in which the pixel center is included in the ellipse is the filter shape, by using a filter 1304 having the shape in which the four corners are removed from the 5×3 filter shape, it is possible to sufficiently compensate the inter-code interference.

In the present embodiment, since the filter coefficient is determined, the size of a circle defining the filtering target region is defined as X direction: s×t×1 and Y direction: s×u×1, (s: a natural number), and calculated with the value of s=1.

However, any calculating formula may be used as long as a calculating formula changes the size according to the lower limit value of the number of consecutive pixels. Furthermore, as a factor determining the shape of the filter coefficient, the size of the aperture, the ratio of, for example, the Nyquist frequency size calculated from the pixel pitch of the spatial light modulator, the size of a condensed signal beam, or the size of a hologram to be recorded may be used.

In the above second embodiment, by two-dimensionally changing the size of the filter coefficient in addition to the advantage described in the first embodiment, it is possible to further reduce the number of multipliers 1201, to restrain the circuit scale, and to accelerate the operation.

Third Embodiment

The different point of a third embodiment from the first embodiment is that a learning page for calculating a filter coefficient is provided per book to perform filter coefficient learning and the same filter coefficient is used in the same book in contrast to the first embodiment in which a filter coefficient is calculated for each page. Consequently, it is possible to sufficiently secure the region for filter coefficient calculation, and to accelerate the operation by reducing the frequency of the filter coefficient calculation.

Figure 14:
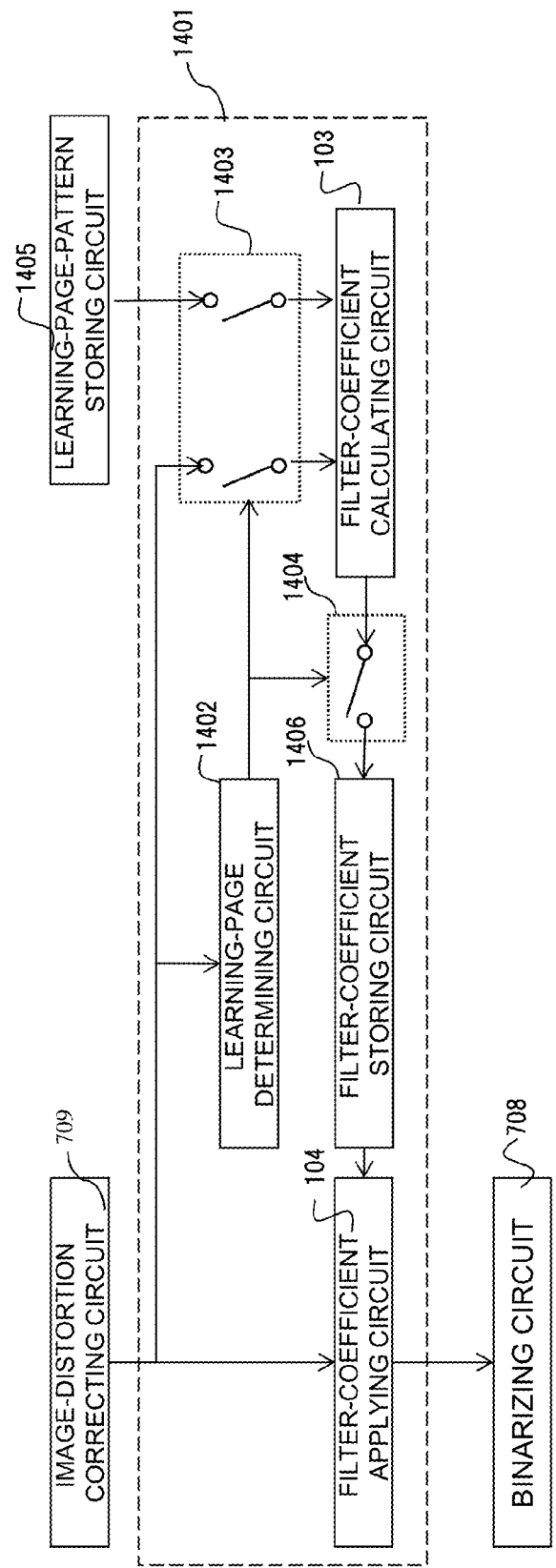
FIG. 14 is a diagram showing a configuration example of a two-dimensional equalizing circuit in the present embodiment.
Figure 15:
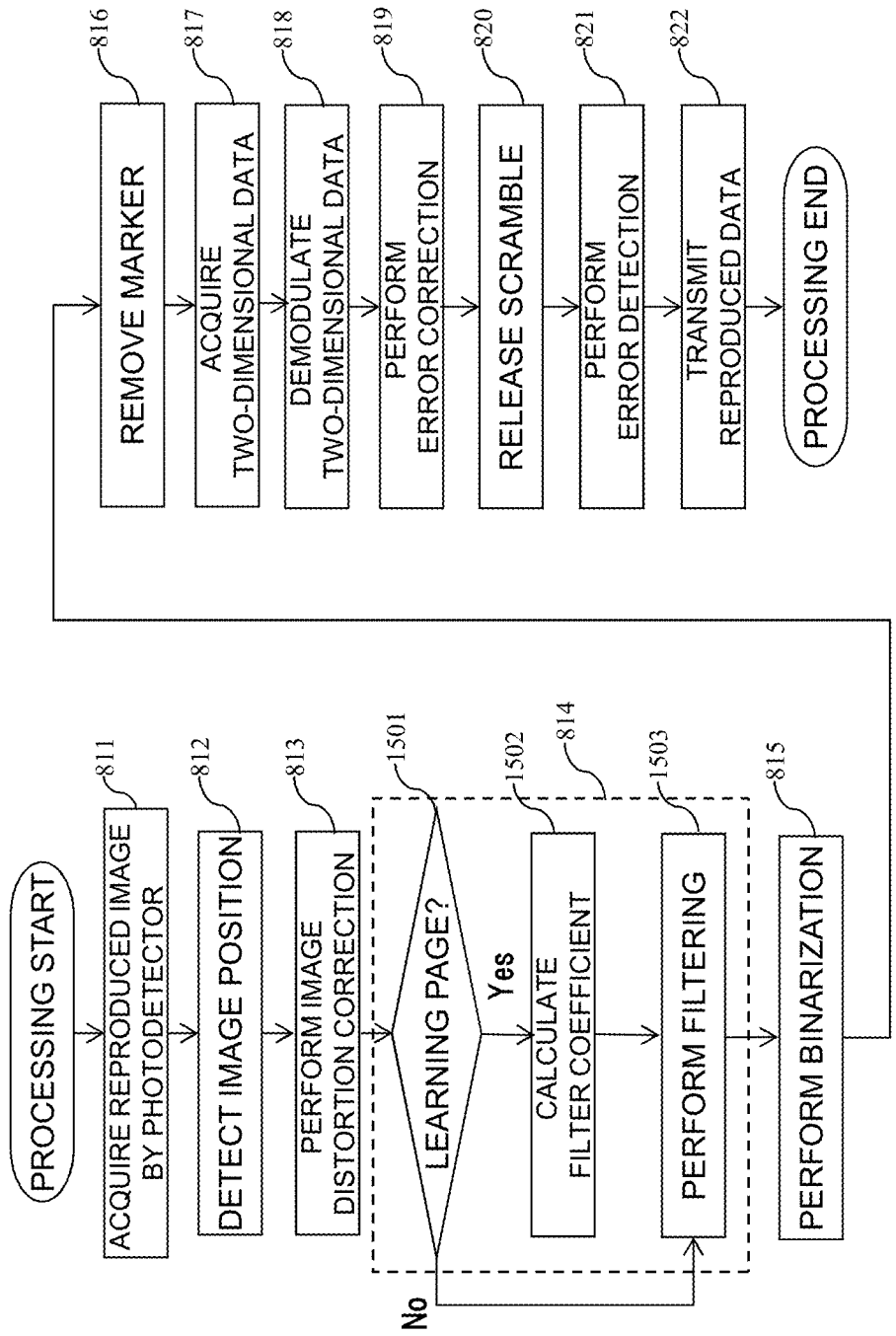
FIG. 15 is a flowchart showing an operational procedure of the signal processing circuit in the present embodiment.

With reference to FIGS. 14 and 15, filter coefficient calculation using a learning page is described.

FIG. 14 shows a configuration of a two-dimensional equalizing circuit 1401 in the third embodiment. FIG. 15 shows a procedure of two-dimensional equalization processing using a learning page.

An image-distortion correcting circuit 709 outputs image data subjected to the position detection and distortion correction to a learning-page determining circuit 1402 of the two-dimensional equalizing circuit 1401.

The learning-page determining circuit 1402 determines whether the image is a learning page (1501). The determination of the learning page is performed by, for example, defining a page having a specific page number as the learning page, and associating the page with the reference beam angle at the time of reproducing. Furthermore, a first page when a book is reproduced may be defined as the learning page instead of using a page number, or data for identifying the learning page is recorded in a page.

In an initial state, switches 1403 and 1404 are opened.

When the learning-page determining circuit 1402 determines that the image is not a learning page, a learning-page-pattern storing circuit 1405 and a filter-coefficient calculating circuit 103 do not operate, and a filter-coefficient applying circuit 104 performs filtering using the coefficient stored in a filter-coefficient storing circuit 1406 (1503), and then outputs the output to a binarizing circuit 708.

When the learning-page determining circuit 1402 determines that the image is a learning page, the learning-page determining circuit 1402 shuts the switches 1403 and switch 1404, and outputs the image data to the filter-coefficient calculating circuit 103. Simultaneously, the learning-page-pattern storing circuit 1405 outputs a learning page pattern in an ideal state to the filter-coefficient calculating circuit 103 as an ideal signal, and the filter-coefficient calculating circuit 103 calculates the filter coefficient (1502).

After the filter-coefficient calculating circuit 103 outputs the calculated coefficient to the filter-coefficient storing circuit 1406 to store the coefficient, the filter-coefficient applying circuit 104 performs filtering using the coefficient stored in the filter-coefficient storing circuit 1406 (1503), and outputs the output to the binarizing circuit 708.

In the present embodiment, the filter coefficient is calculated by providing one learning page per book. However, calculation frequency of the filter coefficient may be increased by providing a plurality of learning pages per book, or calculation frequency of the filter coefficient may be reduced by providing one learning page in a plurality of books.

In the above third embodiment, by calculating the filter coefficient using the learning page in addition to the advantage described in the first embodiment, it is possible to secure a sufficient region for calculating the filter coefficient, to reduce the frequency of the filter coefficient calculation, and to accelerate the operation.

Fourth Embodiment

The different point of the present embodiment from the first embodiment is that a coefficient is calculated after pixel defects on an image sensor are eliminated when the filter coefficient is calculated. Although the filter coefficient is calculated using the reproduced image and the ideal signal as described above, if a defective region of a reproduced image attributable to the pixel defects on the image sensor exists, the calculation of the filter coefficient using the reproduced image including the defective region can cause an error. In consideration of this, after removing the defect of the reproduced image attributable to pixel defect on the image sensor when the filter coefficient is calculated, the filter coefficient is to be calculated in the present embodiment.

As a method for detecting position information on the pixel defect, by, for example, recording/reproducing a known data pattern which is a conventional technique, the pixel defect information may be detected.

Figure 16B:
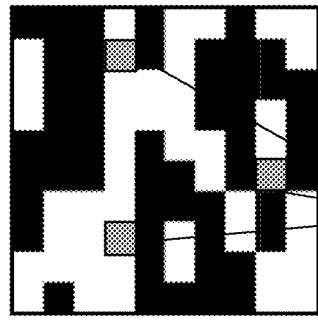
FIG. 16b is a diagram showing an example of a defective-pixel removing region when a filter coefficient is calculated in the present embodiment.
Figure 16A:
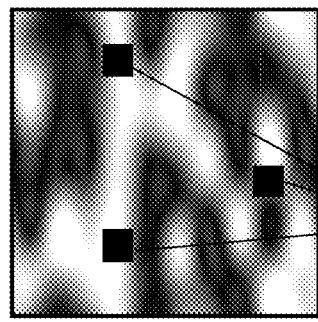
FIG. 16a is a diagram showing an example of a region of defective pixels occurring on a reproduced image in the present embodiment.

FIGS. 16*a* and 16*b* show a defective region of a reproduced image and a filter-coefficient-calculation removing region of an ideal signal corresponding to the defective region.

FIG. 16*a* shows an example of a region of defective pixels occurring on the reproduced image. FIG. 16*b* shows an example of a position on the ideal signal corresponding to the region of the defective pixels on the reproduced image. When the filter coefficient is calculated, by calculating the filter coefficient using only the region except for a removing region shown in FIG. 16*b*, the filter coefficient can be calculated without being affected by the defective region.

Although the defect on the image sensor has been described as a factor causing defect on the reproduced image in the present embodiment, the factor may be defect of the reproduced image which fixedly occurs due to defect of the optical system or defect of the reproduced image which fixedly occurs due to defect of the spatial light modulator.

In the above fourth embodiment, by eliminating the defective region and calculating the filter coefficient in addition to the advantage described in the first embodiment, it is possible for the calculated filter coefficient to be precise, which leads to the improvement of the reliability of the equalization processing.

Furthermore, the present invention is not limited to the above embodiments and includes various modifications. For example, the above embodiments are described in detail to easily understand the present invention, and the present invention is not necessarily limited to the ones including all the described configurations. Furthermore, a part of the configuration of an embodiment may be replaced with a part of the configuration of another embodiment, and the configuration of an embodiment may be added to the configuration of another embodiment. Moreover, addition, deletion, and replacement of another configuration may be made in apart of the configuration of each embodiment.

Furthermore, a part of or all of the above configurations, functions, processing units, processing means, and the like may be implemented by hardware by, for example, being designed by an integrated circuit. Moreover, the above configurations, functions, and the like may be implemented by software by interpreting and running a program which implements the functions by a processor. Information for implementing the functions, such as a program, a table, and a file, may be stored in a recording device, such as a memory, a hard disk, or a solid state drive (SSD) or in a storage medium, such as an IC card, an SD card, or a DVD.

The control line and the information line necessary for description are shown, and all control lines and information lines necessary for a product are not necessarily shown. In practical, it can be considered that almost all configurations are connected mutually.

REFERENCE SIGNS LIST

1 Optical information storage medium
10 Optical information recording/reproducing device
11 Pickup
12 Reproducing-reference-beam optical system
13 Disc cure optical system
14 Disk-rotating-angle detection optical system
81 Access controlling circuit
82 Light source driving circuit
83 Servo signal generating circuit
84 Servo controlling circuit
85 Signal processing circuit
86 Signal generating circuit
87 Shutter controlling circuit
88 Disc-rotating-motor controlling circuit
89 Controller
90 Input/output controlling circuit
91 External control device
101 Two-dimensional equalizing circuit
102 Binarizing circuit
103 Filter-coefficient calculating circuit
104 Filter coefficient applying circuit
301 Light source
303 Shutter
306 Signal beam
307 Reference beam
308 Beam expander
309 Phase mask
310 Relay lens
311 PBS prism
312 Spatial light modulator
313 Relay lens
314 Aperture
315 Objective lens
316 Polarizing direction conversion element
320 Actuator
321 Lens
322 Lens
323 Actuator
324 Mirror
325 Photodetector
326 Reproduced beam
601 Sub-controller
602 Memory
603 Memory controlling circuit
604 CRC operating circuit
605 Scrambling circuit
606 Error correction encoding circuit
607 Two-dimensional modulating circuit
608 Pickup interface circuit
701 Sub-controller
702 Memory
703 Memory controlling circuit
704 CRC operating circuit
705 Descrambling circuit
706 Error correcting circuit
707 Two-dimensional demodulating circuit
708 Binarizing circuit
709 Image-distortion correcting circuit
710 Image position detecting circuit
711 Pickup interface circuit
1101 Spatial-light-modulator display pattern (t=1, u=1)
1102 Aperture
1103 Filter coefficient (3×3)
1104 Spatial-light-modulator display pattern (t=2, u=1)
1105 Two-dimensional aperture
1106 Filter coefficient (5×3)
1107 Spatial-light-modulator display pattern (t=2, u=2)
1108 Two-dimensional aperture
1109 Filter coefficient (5×5)
1201 Multiplier
1202 Adder
1301 Necessary filter coefficient region (t=1, u=1)
1302 Filter coefficient (3×3, four ends removed)
1303 Necessary filter coefficient region (t=2, u=1)
1304 Filter coefficient (5×3, four ends removed)
1501 Learning page determining circuit
1502 Switch 1
1503 Switch 2
1504 Learning page pattern storing circuit
1505 Filter coefficient storing circuit

The invention claimed is:

1. An optical information recording/reproducing device which records an interference pattern between a reference beam and a signal beam as a hologram in an optical information storage medium or reproduces information from the optical information storage medium, the optical information recording/reproducing device comprising:
a light source unit configured to emit a light beam;
a signal-beam/reference-beam optical unit configured to generate the signal beam and the reference beam from the light beam, and to irradiate the optical information storage medium;
a spatial light modulator configured to add information to the generated signal beam;
a photodetection unit configured to detect a reproduced beam from the optical information storage medium, and to acquire a reproduced image constituted by a plurality of pixels arrayed in a lattice shape; and
a signal processing unit configured to perform, based on an array rule of ON pixels or OFF pixels in the spatial light modulator, equalization processing to a first pixel of the reproduced image using a filter used to equalize the first pixel and having a filter shape which is an array shape of the first pixel and peripheral pixels of the first pixel, wherein the filter shape has a different number of coefficients in a first direction from the number of coefficients in a second direction perpendicular to the first direction.

2. The optical information recording/reproducing device according to claim 1, wherein
when a lower limit value of the number of consecutive pixels with respect to an array of pixels in the first direction of the reproduced image is t (t: a natural number) and a lower limit value of the number of consecutive pixels with respect to an array of pixels in the second direction is u (u: a natural number) in the array rule of the ON pixels or the OFF pixels in the spatial light modulator, the filter shape has the number of coefficients in the first direction being $2 \times s \times t+1$, and the number of coefficients in the second direction being $2 \times s \times u+1$ (s: a natural number).

3. The optical information recording/reproducing device according to claim 1, wherein
when the array rule of the ON pixels or the OFF pixels in the spatial light modulator is based on a two-dimensional encoding method in which a lower limit value of the number of consecutive pixels with respect to an array of pixels in the first direction of the reproduced image is L ($L \geq 2$, L: a natural number), the filter shape has the number of coefficients in the first direction being $2 \times s \times L+1$ (s: a natural number).

4. The optical information recording/reproducing device according to claim 1, wherein
when the array rule of the ON pixels or the OFF pixels in the spatial light modulator is based on a two-dimensional encoding method in which a lower limit value of the number of consecutive pixels with respect to an array of pixels in the first direction of the reproduced image is L ($L \geq 2$, L: a natural number) and a lower limit value of the number of consecutive pixels with respect to an array of pixels in the second direction perpendicular to the first direction is K ($K \geq 2$, K: a natural number), the filter shape has the number of coefficients in the first direction being $2 \times s \times L+1$, and the number of coefficients in the second direction being $2 \times s \times K+1$ (s: a natural number).

5. The optical information recording/reproducing device according to claim 1, wherein
when a lower limit value of the number of consecutive pixels with respect to an array of pixels in the first direction of the reproduced image is t (t: a natural number) and a lower limit value of the number of consecutive pixels with respect to an array of pixels in the second direction perpendicular to the first direction is u (u: a natural number) in the array rule of the ON pixels or the OFF pixels in the spatial modulator, the filter shape is an array shape of the peripheral pixels in which a pixel center is included in an ellipse centered at the first pixel and defined by a diameter in the first direction being $2 \times s \times t+1$, and a diameter in the second direction being $2 \times s \times u+1$ (s: a natural number).

6. The optical information recording/reproducing device according to claim 1, wherein
when the array rule of the ON pixels or the OFF pixels in the spatial light modulator is based on a two-dimensional encoding method in which a lower limit value of the number of consecutive pixels with respect to an array of pixels in the first direction of the reproduced image is L ($L \geq 2$, L: a natural number), the filter shape is an array shape of the peripheral pixels in which a pixel center is included in an ellipse centered at the first pixel and defined by a diameter in the first direction being $2 \times s \times L+1$ (s: a natural number), and a diameter in the second direction perpendicular to the first direction being $2 \times s+1$.

7. The optical information recording/reproducing device according to claim 1, wherein
when the array rule of the ON pixels or the OFF pixels in the spatial light modulator is based on a two-dimensional encoding method in which a lower limit value of the number of consecutive pixels with respect to an array of pixels in the first direction of the reproduced image is L ($L \geq 2$, L: a natural number) and a lower limit value of the number of consecutive pixels with respect to an array of pixels in the second direction perpendicular to the first direction is K ($K \geq 2$, K: a natural number), the filter shape is an array shape of the peripheral pixels in which a pixel center is included in a circle or ellipse centered at the first pixel and defined by a diameter in the first direction being $2 \times s \times L+1$ (s: a natural number), and a diameter in the second direction being $2 \times s \times K+1$.

8. The optical information recording/reproducing device according to claim 1, wherein
the hologram is angular-multiplexing-recorded by changing angles of incidence of the reference beam to the optical information storage medium, and
when a hologram corresponding to each of the angles of incidence of the reference beam is a page and a plurality of angular-multiplexed pages is a book, the signal processing unit calculates a coefficient of the filter for each page.

9. The optical information recording/reproducing device according to claim 1, wherein
the hologram is angular-multiplexing-recorded by changing angles of incidence of the reference beam to the optical information storage medium, and
when a hologram corresponding to each of the angles of incidence of the reference beam is a page and a plurality of angular-multiplexed pages is a book, the signal processing unit calculates a coefficient of the filter for each book.

10. The optical information recording/reproducing device according to claim 1, wherein
when the reproduced image includes a defective pixel, the signal processing unit calculates the coefficient of the filter using a pixel other than the defective pixel.

11. An optical information reproducing device which reproduces information recorded by performing two-dimensional encoding to an interference pattern between a reference beam and a signal beam as a hologram in an optical information storage medium, the optical information reproducing device comprising:
a light source unit configured to emit a light beam;
a reference-beam optical unit configured to generate the reference beam from the light beam, and to irradiate the optical information storage medium;
a photodetection unit configured to detect a reproduced beam from the optical information storage medium, and to acquire a reproduced image constituted by a plurality of pixels arrayed in a lattice shape; and
a signal processing unit configured to perform, based on a rule of the two-dimensional encoding, equalization processing to a first pixel of the reproduced image using a filter used to equalize the first pixel and having a filter shape which is an array shape of the first pixel and peripheral pixels of the first pixel, wherein the filter shape has a different number of coefficients in a first direction from the number of coefficients in a second direction perpendicular to the first direction.

12. The optical information reproducing device according to claim 11, wherein
when a lower limit value of the number of consecutive pixels with respect to an array of pixels in the first direction of the reproduced image is L (L≥2, L: a natural number) in the rule of the two-dimensional encoding, the filter shape has the number of coefficients in the first direction being 2×s×L+1 (s: a natural number).

13. The optical information reproducing device according to claim 11, wherein
when a lower limit value of the number of consecutive pixels with respect to an array of pixels in the first direction of the reproduced image is L (L≥2, L: a natural number) and a lower limit value of the number of consecutive pixels with respect to an array of pixels in the second direction perpendicular to the first direction is K (K≥2, K: a natural number) in the rule of the two-dimensional encoding, the filter shape has the number of coefficients in the first direction being 2×s×L+1, and the number of coefficients in the second direction being 2×s×K+1 (s: a natural number).

14. The optical information reproducing device according to claim 11, wherein
a lower limit value of the number of consecutive pixels with respect to an array of pixels in the first direction of the reproduced image is L (L≥2, L: a natural number) in the rule of the two-dimensional encoding, the filter shape is an array shape of the peripheral pixels in which a pixel center is included in an ellipse centered at the first pixel and defined by a diameter in the first direction being 2×s×L+1 (s: a natural number), and a diameter in the second direction perpendicular to the first direction being 2×s+1.

15. The optical information reproducing device according to claim 11, wherein
when a lower limit value of the number of consecutive pixels with respect to an array of pixels in the first direction of the reproduced image is L (L≥2, L: a natural number) and a lower limit value of the number of consecutive pixels with respect to an array of pixels in the second direction perpendicular to the first direction is K (K≥2, K: a natural number) in the rule of the two-dimensional encoding, the filter shape is an array shape of the peripheral pixels in which a pixel center is included in a circle or ellipse centered at the first pixel and defined by a diameter in the first direction being 2×s×L+1 (s: a natural number), and a diameter in the second direction being 2×s×K+1.

16. The optical information reproducing device according to claim 11, wherein
the hologram is angular-multiplexing-recorded by changing angles of incidence of the reference beam to the optical information storage medium, and
when a hologram corresponding to each of the angles of incidence of the reference beam is a page and a plurality of angular-multiplexed pages is a book, the signal processing unit calculates a coefficient of the filter for each page.

17. The optical information reproducing device according to claim 11, wherein
the hologram is angular-multiplexing-recorded by changing angles of incidence of the reference beam to the optical information storage medium, and
when a hologram corresponding to each of the angles of incidence of the reference beam is a page and a plurality of angular-multiplexed pages is a book, the signal processing unit calculates a coefficient of the filter for each book.

18. An optical information reproducing method for reproducing information recorded by performing two-dimensional encoding to an interference pattern between a reference beam and a signal beam as a hologram in an optical information storage medium, the optical information reproducing method comprising:
a light beam emission step of emitting a light beam;
a reference beam irradiation step of generating the reference beam from the light beam, and irradiating the optical information storage medium;
a photodetection step of detecting a reproduced beam from the optical information storage medium, and acquiring a reproduced image constituted by a plurality of pixels arrayed in a lattice shape; and
a signal processing step of performing equalization processing to a first pixel of the reproduced image using peripheral pixels existing around the first pixel, wherein
the peripheral pixels are pixels arrayed in a rectangular region centered at the first pixel in the reproduced image and having a different number of pixels in the first direction from the number of pixels in the second direction perpendicular to the first direction.

19. The optical information reproducing method according to claim 18, wherein
when a lower limit value of the number of consecutive pixels with respect to an array of pixels in the first direction of the reproduced image is L (L≥2, L: a natural number) in a rule of the two-dimensional encoding, the number of pixels of the peripheral pixels in the first direction is 2×s×L+1 (s: a natural number).

* * * * *